United States Patent [19]

Yu et al.

[11] Patent Number: 5,371,506

[45] Date of Patent: Dec. 6, 1994

[54] SIMULTANEOUS MULTIBEAM APPROACH FOR CANCELLING MULTIPLE MAINLOBE JAMMERS WHILE PRESERVING MONOPULSE ANGLE ESTIMATION ACCURACY ON MAINLOBE TARGETS

[75] Inventors: Kai-Bor Yu, Schenectady; David J. Murrow, Clifton Park, both of N.Y.

[73] Assignee: General Electric Co., Schenectady, N.Y.

[21] Appl. No.: 93,167

[22] Filed: Jul. 19, 1993

[51] Int. Cl.$^5$ .............................................. G01S 7/36
[52] U.S. Cl. .................... 342/380; 342/379; 342/149; 342/381
[58] Field of Search .............. 342/379, 380, 381, 382, 342/149

[56] References Cited

U.S. PATENT DOCUMENTS 4,555,706 11/1985 Haupt ................................. 343/379
5,173,700 12/1992 Chesley ........................... 342/149 X

OTHER PUBLICATIONS

R. C. Davis et al., "Angle Estimation with Adaptive Arrays in External Noise Fields", IEEE Trans. on Aerospace and Electronic Systems, vol. AES-12, No. 2, Mar. 1976, pp. 179–186.
R. R. Kinsey, "Monopulse Difference Slope and Gain Standards", IRE Transactions on Antennas and Propagation, vol. AP-10, pp. 343–344, May 1962.
P. W. Howells, "Exploration in Fixed and Adaptive Resolution at GE and SURC", IEEE Transactions on Antennas and Propagation, vol. AP-24, No. 5, Sep. 1976, pp. 575–584.
S. P. Applebaum et al., "Mainbeam Jammer Cancellation for Monopulse Sensors", RADC-Tr-84-267 Final Technical Report, Dec., 1984.
Yu et al. application Ser. Nos. 07/807,548, 07/807,546 filed Dec. 16, 1991.
N. K. Jablon, "Steady State Analysis of the Generalized Sidelobe Canceller by Adaptive Noise Cancelling Techniques", IEEE Trans. on Antennas and Propagation, vol. AP-34, No. 3, Mar. 1986, pp. 330–337.
H. Cox et al., "Robust Adaptive Beamforming", IEEE Trans. on Acoustic, Speech, and Signal Processing, vol. ASSP-35, No. 10, Oct. 1987, pp. 1365–1376.
B. Widrow, "Signal Cancellation Phenomena in Adaptive Antennas: Causes and Cures", IEEE Trans. on Antennas and Propagation, vol. AP-30, No. 3, May 1982, pp. 469–478.
T-J. Shan et al., "Adaptive Beamforming for Coherent Signals and Interference", IEEE Trans. on Acoustics, Speech, and Signal Processing, vol. ASSP-33, No. 3, Jun. 1985, pp. 527–536.
R. L. Haupt, "Simultaneous Nulling in the Sum and Difference Patterns of a Monopulse Antenna", IEEE Trans. on Antennas and propagation, vol. AP-32, No. 5, May 1984, pp. 486–493.
R. L. Haupt, "Adaptive Nulling in Monopulse Antennas", IEEE Trans. on Antennas and Propagation, vol. 36, No. 2, Feb. 1988, pp. 202–208.
T. B. Vu, "Simultaneous Nulling in Sum and Difference Patterns by Amplitude Control", IEEE Transactions on Antennas and Propagation, vol. AP-34, No. 2, Feb. 1986, pp. 214–218.
R. O. Schmidt, "Multiple Emitter Location and Signal Parameter Estimation", IEEE Trans. on Antennas and Propagation, vol. AP-34, No. 3, Mar. 1986, pp. 276–280.

Primary Examiner—Mark Hellner
Attorney, Agent, or Firm—C. A. Nieves; S. A. Young; M. Snyder

[57] ABSTRACT

An improvement in monopulse radar achieves nulling of multiple mainlobe jammers while maintaining the angle measurement accuracy of the monopulse ratio by using multiple simultaneous beams, thereby obtaining the additional degrees of freedom necessary for cancelling more than one mainlobe jammer (MLJ). The beams are placed one null beamwidth apart in order to maintain orthogonality. The MLJs are nulled in the orthogonal direction of the angle estimate giving undistorted monopulse ratios.

4 Claims, 19 Drawing Sheets

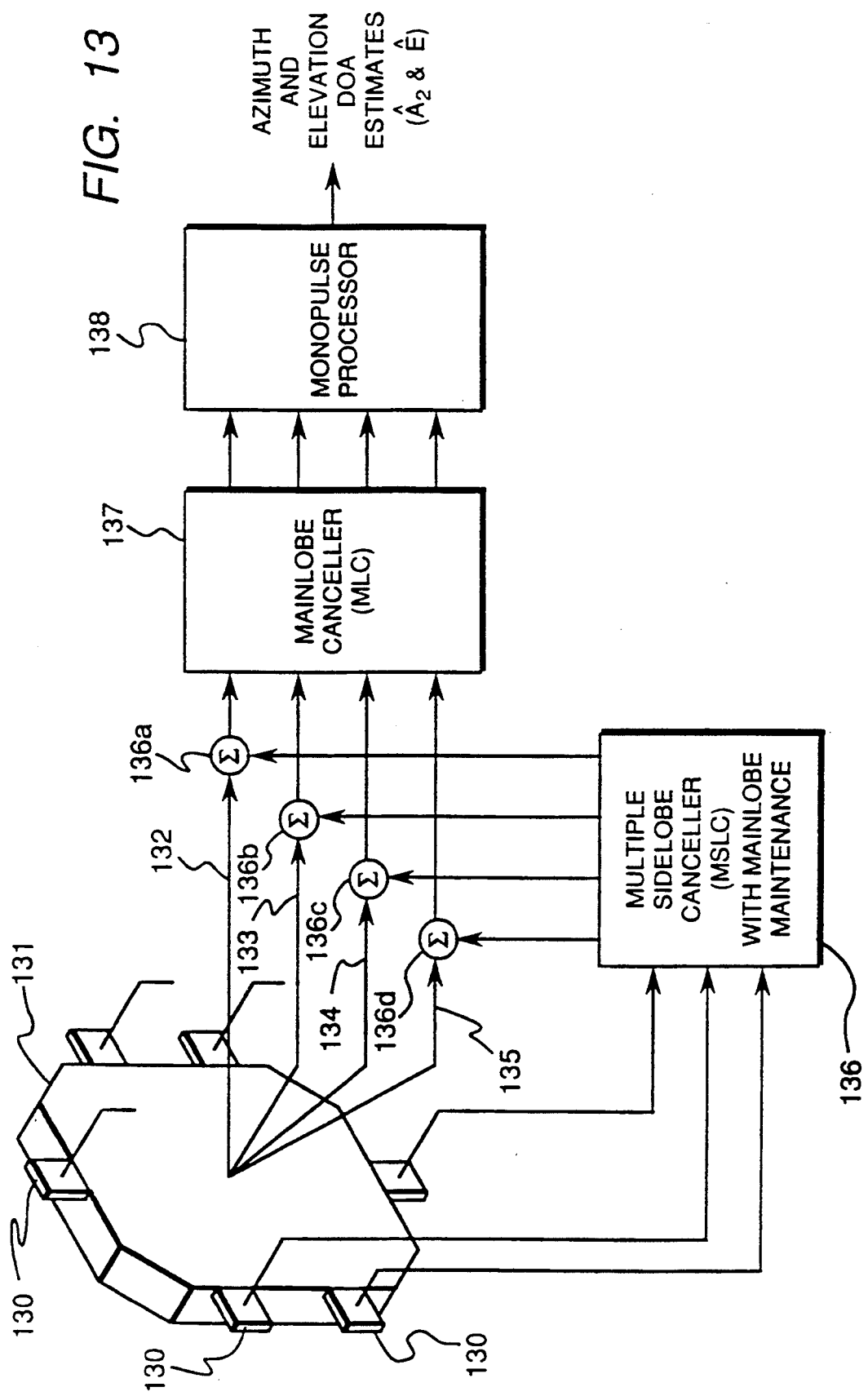

SIMULTANEOUS MULTIBEAM APPROACH FOR CANCELLING MULTIPLE MAINLOBE JAMMERS WHILE PRESERVING MONOPULSE ANGLE ESTIMATION ACCURACY ON MAINLOBE TARGETS

CROSS REFERENCE TO RELATED APPLICATIONS

This application is related to Yu and Marrow application Ser. Nos. 07/807,546 and 07/807,548 filed Dec. 16, 1991, and assigned to the assignee of this application.

BACKGROUND OF THE INVENTION

1. Field of the Invention

This invention generally relates to radar techniques for determining angular location of a target and, more particularly, to an improvement in the monopulse technique so as to maintain accuracy of the monopulse ratio in the presence of simultaneous jamming from multiple mainlobe jammers.

2. Description of the Prior Art

The monopulse technique is a radar technique in which the angular location of a target can be determined within fractions of a beamwidth by comparing measurements received by two or more simultaneous beams. This technique for direction of arrival (DOA) estimation of a target is widely employed in modern surveillance and tracking radar. See, for example, D. K. Barton, "Modern Radar Systems Analysis", *Artech House* (1988), M. Sherman, "Monopulse Principles and Techniques", *Artech House* (1984),and I. Leanov and K. I. Fomichev, "Monopulse Radar", *Artech House* (1986). In a typical phased array or digital beamforming (DBF) radar, one beam is formed in transmission, and two beams are formed on reception for angle measurement.

The monopulse technique may be implemented for a linear array of N antenna elements which provide respective signals $x(0), \ldots, x(N-1)$ to the beam forming network from the elemental receivers. The output signals of the beam forming network are the sum, $\Sigma$, and difference, $\Delta$, signals which are processed in a processor to generate an output signal, $\theta$, representing the direction of arrival estimation.

In the beamforming network, each of the N input signals is split into two paths, linearly weighted, and then added together. The sum $\Sigma$ and difference $\Delta$ signals may be expressed in the form $$\Sigma = W_\Sigma^H x \quad (1)$$

$$\Delta = W_\Delta^H x \quad (2)$$

respectively, where $W_\Sigma$ is real and even weighting, $W_\Delta$ is purely imaginary and odd weighting, H indicates the complex conjugate transpose and x is the vector of the measurements. When there is no jamming, Taylor and Bayliss weightings are typically used for sum beams and difference beams, respectively, so as to have a narrow mainlobe and low sidelobes. In the presence of jamming, the weights are adapted so as to form nulls responsive to the jammers. The quiescent Taylor and Bayliss weightings are designed for reducing the sidelobes in a practical system. See Y. T. Lo and S. W. Lee, "Antenna Handbook," *Theory, Applications and Design*, Van Nostrand Reinhold Company, New York (1988), Chapter 13.

In a typical antenna pattern, the mainlobe of the pattern is a central beam surrounded by minor lobes, commonly referred to as sidelobes. Typically, it is desired to have a narrow mainlobe, high gain and low sidelobes so that the desired target within the mainlobe is enhanced and the response to clutter and jamming outside the mainlobe is attenuated. The sidelobe levels of an antenna pattern can be described in several ways. The most common expression is the relative sidelobe level, defined as the peak level of the highest sidelobe relative to the peak level of the main beam. Sidelobe levels can also be quantified in terms of their absolute level relative to isotropic.

The term "monopulse" refers to the fact that the echo from a single transmitter pulse returning from a target is used to measure the angle of the target, and typically, one beam (instead of two beams) is formed in transmission, and two beams are formed on reception for angle measurement. The sum beam has a symmetrical amplitude profile with its maximum at the boresight, and the difference beam has an antisymmetrical amplitude profile with zero response at the boresight. The DOA of a target signal can be determined accurately through a look-up table by evaluating the monopulse ratio, i.e., the real part of $\Delta/\Sigma$. In fact, for a noiseless case and for uniform weighting, the monopulse ratio is exactly as given by $$f(\theta) = \frac{\Delta(\theta)}{\Sigma(\theta)} = \tan\left(\pi T \frac{Nd}{2\lambda}\right) \quad (3)$$

where $T = \sin(\theta)$ and $(\theta)$ is the desired DOA, d is the array element spacing, N is the number of sensor elements, and $\lambda$ is the wavelength. This equation enables T and the corresponding $\theta$ to be determined exactly. In the presence of noise, the development of the DOA maximum likelihood estimator also leads naturally to monopulse processing using sum and difference beams. See R. C. David, L. E. Brennan, and I. S. Reed, "Angle Estimation with Adaptive Arrays in External Noise Field," *IEEE Trans. on Aerospace and Electronic Systems*, Vol. AES-12, No. 2, March 1976. For zero-mean noise, the estimator is unbiased with mean square error (MSE) given by $$MSE = \frac{1}{2k_2 SNR} \quad (4)$$

where $k_1 = \left(\frac{f^2|g(T)|^2}{1+f^2}\right)^{\frac{1}{2}}$, which is known to be the monopulse sensitivity factor, f, is the monopulse function and f is the derivative of f. SNR is the signal-to-noise ratio at the elemental level, and g(T) is the two-way sum beam antenna pattern.

Various authors have defined the monopulse sensitivity factor in different ways (see R. R. Kinsey, "Monopulse Difference Slope and Gain Standards", *IRE Trans*, Vol AP-10, pp. 343–344, May 1962.) In this application, the monopulse sensitivity factor is defined as the constant of proportionality required in the denominator of the root-mean-square-error (RMSE) to convert the square root of twice the boresight signal-to-noise ratio in the beam to RMSE. Defined in this manner, the monopulse sensitivity factor has the desirable property of containing all target angle-of-arrival information. See D. J. Murrow, "Height Finding and 3D Radar," Chapter 20, Radar Handbook (2nd Edition), McGraw-Hill.

This technique can also be considered for a planar array where the target azimuth and elevation angles are desired. In this setup, a set of sum ($\Sigma_e$) and difference ($\Delta_e$) beams are formed along the elevation axis with input signals from each column of sensors. The $\Sigma_e$ beams are then linearly combined in a row beamformer to form the sum ($\Sigma = \Sigma_a \Sigma_e$) and difference ($\Delta_A = \Delta_a \Sigma_e$) beam along the azimuth axis, where $\Sigma_e$ and $\Delta_a$ are the effective row sum beam and row difference beam respectively. Similarly, the $\Delta_e$ beams are linearly combined in an adder to form the sum ($\Delta_E = \Sigma_a \Delta_e$) and difference ($\Delta_A = \Delta_a \Delta_e$) beams along the azimuth axis. Monopulse ratios along azimuth or elevation direction can then be formed giving the azimuth and elevation DOA estimates by using the following equations:

$$f_a(\theta_a) = \frac{\Delta_A}{\Sigma} = \frac{\Delta_a \Sigma_e}{\Sigma_a \Sigma_e} = \frac{\Delta_a}{\Sigma_a} \quad (5)$$

and $$f_e(\theta_e) = \frac{\Delta_E}{\Sigma} = \frac{\Sigma_a \Delta_e}{\Sigma_a \Sigma_e} = \frac{\Delta_e}{\Sigma_e}. \quad (6)$$

These derivations make use of the separable property of the planar array patterns.

The monopulse technique for DOA estimation fails when there is sidelobe jamming (SLJ) and/or mainlobe jamming (MLJ). If not effectively countered, electronic jamming prevents successful radar target detection and tracking. The situation is exacerbated by introduction of stealth technology to reduce the radar cross section (RCS) of unfriendly aircraft targets. The frequency dependence of the RCS encourages the use of lower microwave frequency bands for detection. This leads to large apertures to achieve angular resolution. Large apertures to achieve small beamwidth result in interception of more jamming. On the other hand, constrained apertures lead to wider beamwidth, which implies interception of more mainlobe jamming.

Heretofore, no viable or practical technique for cancelling multiple mainlobe jammers while preserving target detection and monopulse accuracy has been developed or fielded in a radar. Techniques developed for simultaneous nulling in the sum and difference channels of a monopulse radar work well in the presence of sidelobe jammers but not in the presence of mainlobe jammers. In a marine environment, the operation of a shipboard radar can be severely limited by the presence of multipath jamming (i.e. two or more jamming paths in close proximity to each other and the jamming are received within the main beam), particularly at low elevation angles. Moreover, the jammers are coherent as they originate from the same source. This makes the conception and development of a technique applicable to the multipath mainlobe jamming problem one of the more pressing and critical issues facing radar today. The challenge is to cancel multiple mainlobe jammers while maintaining target detection and angle estimation accuracy on mainlobe targets.

SUMMARY OF THE INVENTION

It is therefore an object of the present invention to cancel multiple mainlobe jammers while maintaining target detection and angle estimation accuracy on mainlobe targets.

More specifically, it is an object of the invention to use multiple simultaneous beams for cancelling multiple mainlobe jammers.

This invention is a technique which cancels multiple mainlobe jammers while preserving detection and monopulse accuracy performance on mainlobe targets. According to the invention, the additional degrees of freedom for cancelling more than one MLJ are achieved by using multiple simultaneous beams. The beams are placed one null beamwidth apart in order to maintain orthogonality. The MLJs are nulled in the orthogonal direction of the angle estimate, giving an undistorted monopulse ratio.

BRIEF DESCRIPTION OF THE DRAWINGS

The foregoing and other objects, aspects and advantages will be better understood from the following detailed description of a preferred embodiment of the invention with reference to the drawings, in which:

FIG. 13 is a block diagram of the architecture for cascading a multiple sidelobe canceler with mainlobe canceler for monopulse processing;

DETAILED DESCRIPTION OF A PREFERRED EMBODIMENT

Figure 1:
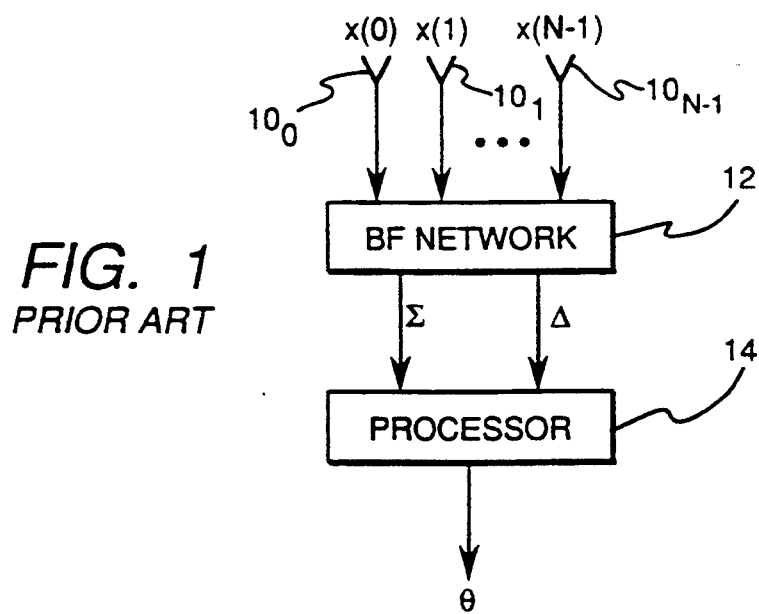
FIG. 1 is a block diagram showing a monopulse beamforming network for estimating direction of arrival.

The monopulse technique for DOA estimation is implemented for a linear array of antenna elements $10_0$ to $10_{N-1}$ which provide respective signals $x(0), \ldots, x(N-1)$, shown in FIG. 1, to the beam forming (BF) network 12 for combining the input signals from the elemental receiver. The output signals of the BF network 12 are the sum $\Sigma$ and difference $\Delta$ signals which are processed in a processor 14 to generate an output signal $\theta$ representing the direction of arrival estimation.

Figure 2:
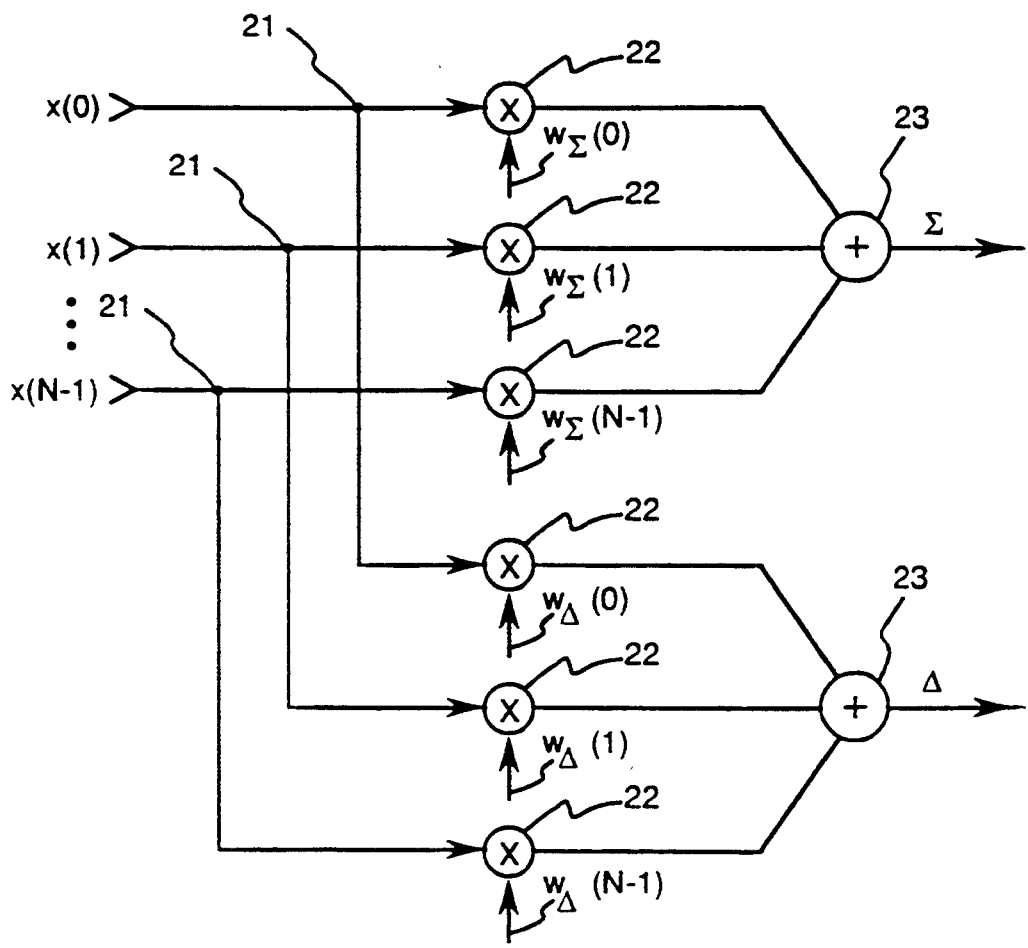
FIG. 2 is a detailed diagram of a beamforming network.

Beamforming network 12 is more fully described in FIG. 2 and comprises voltage splitters 1, weighting network 22 and adders 23. Each of the N input signals is split into two paths which are linearly weighted, and in each of the two paths the N signals are added together.

The sum, $\Sigma$, and difference, $\Delta$, signals are given by equations (7) and (8) as $$\Sigma = W_\Sigma^h x \quad (7)$$

and $$\Delta = W_\Delta^h x, \quad (8)$$

respectively. When there is no jamming, Taylor and Bayliss weightings are typically used for sum beams and difference beams, respectively, so as to have a narrow mainlobe and low sidelobes. In the presence of jamming the weights are adapted so as to form nulls responsive to the jammers. The quiescent Taylor and Bayliss weightings are designed for reducing the sidelobes in a practical system.

Figure 3:
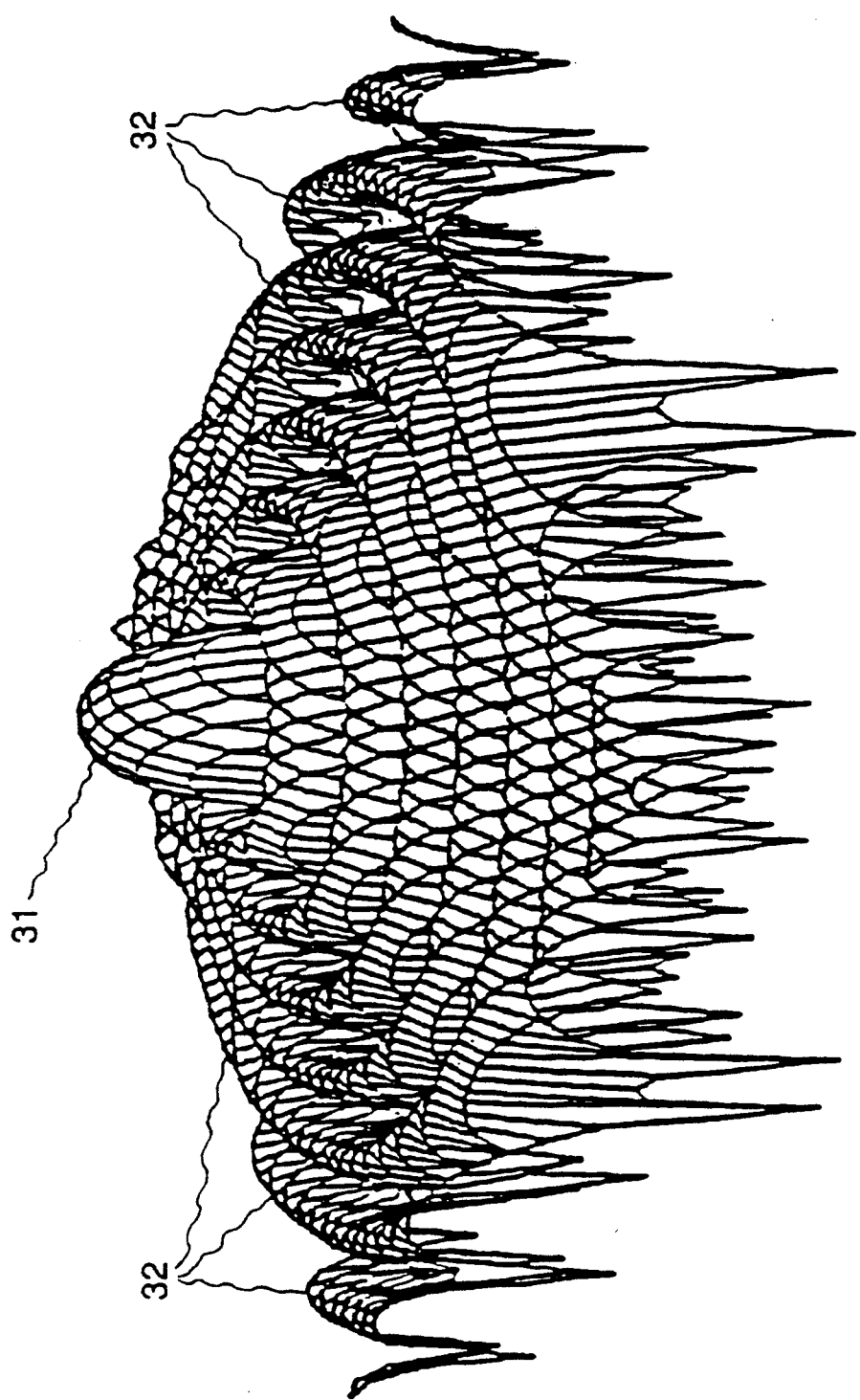
FIG. 3 is a perspective view of a monopulse radar antenna pattern.

FIG. 3 represents a typical sum beam antenna pattern. The mainlobe of the pattern is a central beam 31 surrounded by minor lobes 32, or sidelobes. Typically, it is desired to have a narrow mainlobe, high gain and low sidelobes so that the desired target within the mainlobe is enhanced and the response to clutter and jamming outside the mainlobe is attenuated.

Figure 4:
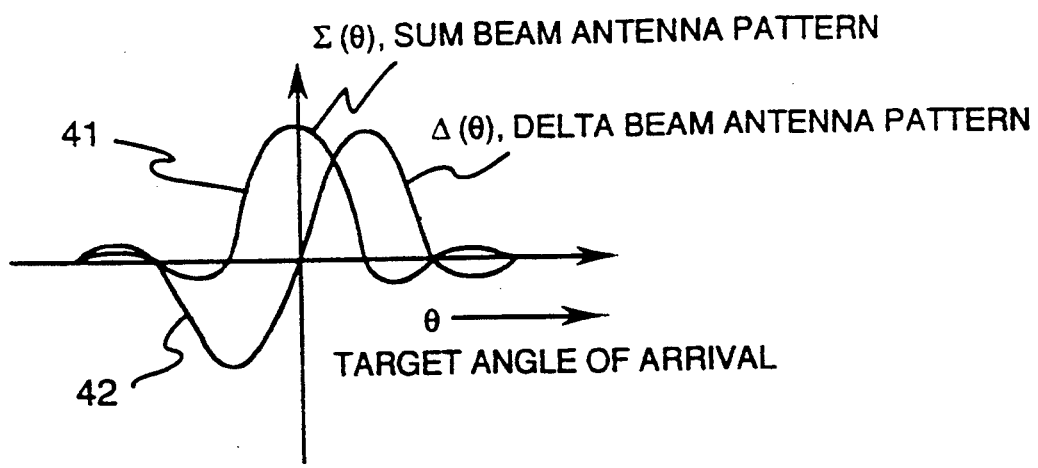
FIG. 4 is a graph of sum and difference beam patterns for monopulse antennas.
Figure 5:
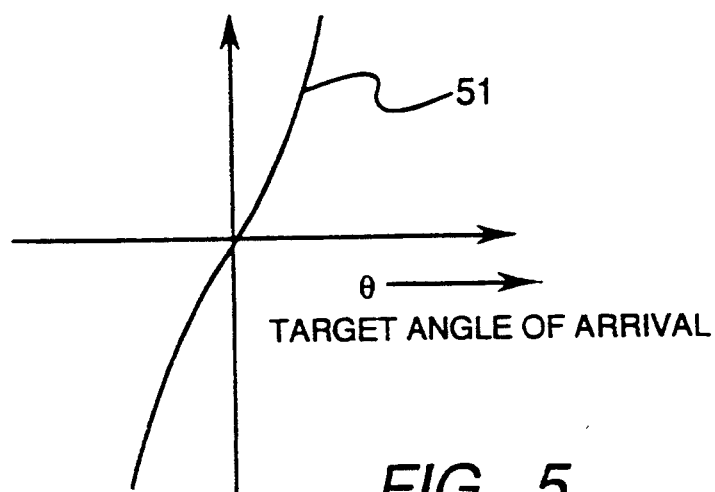
FIG. 5 is a graph of the monpulse ratio.

In the monopulse technique, typically one beam (instead of two beams) is formed in transmission, and two beams are formed on reception for angle measurement. As shown in FIG. 4, the sum beam 41 antenna pattern has a symmetrical amplitude profile with its maximum at the boresight, and the difference beam 42 antenna pattern has an antisymmetrical amplitude profile with zero response at the boresight. The DOA of a target signal can be determined accurately through a look-up table by evaluating the monopulse ratio 51, i.e., the real part of $\Delta/93$, as shown in FIG. 5. For a noiseless case and for uniform weighting, the monopulse ratio is exactly given by equation (9) as $$f(\theta) = \frac{\Delta(\theta)}{\Sigma(\theta)} = \tan\left(\pi T \frac{Nd}{2\lambda}\right). \quad (9)$$

Since $T = \sin(\theta)$, T and the corresponding $\theta$ can be determined exactly. For zero-mean noise, the DOA maximum likelihood estimator is unbiased with mean square error (MSE) given by equation (10) as $$MSE = \frac{1}{2k_2 SNR} \quad (10)$$

where $k_1 = \left(\frac{f^2 |g(T)|^2}{1+f^2}\right)^{\frac{1}{2}}$ is the monopulse sensitivity factor, which contains all target angle-of-arrival information.

Figure 6:
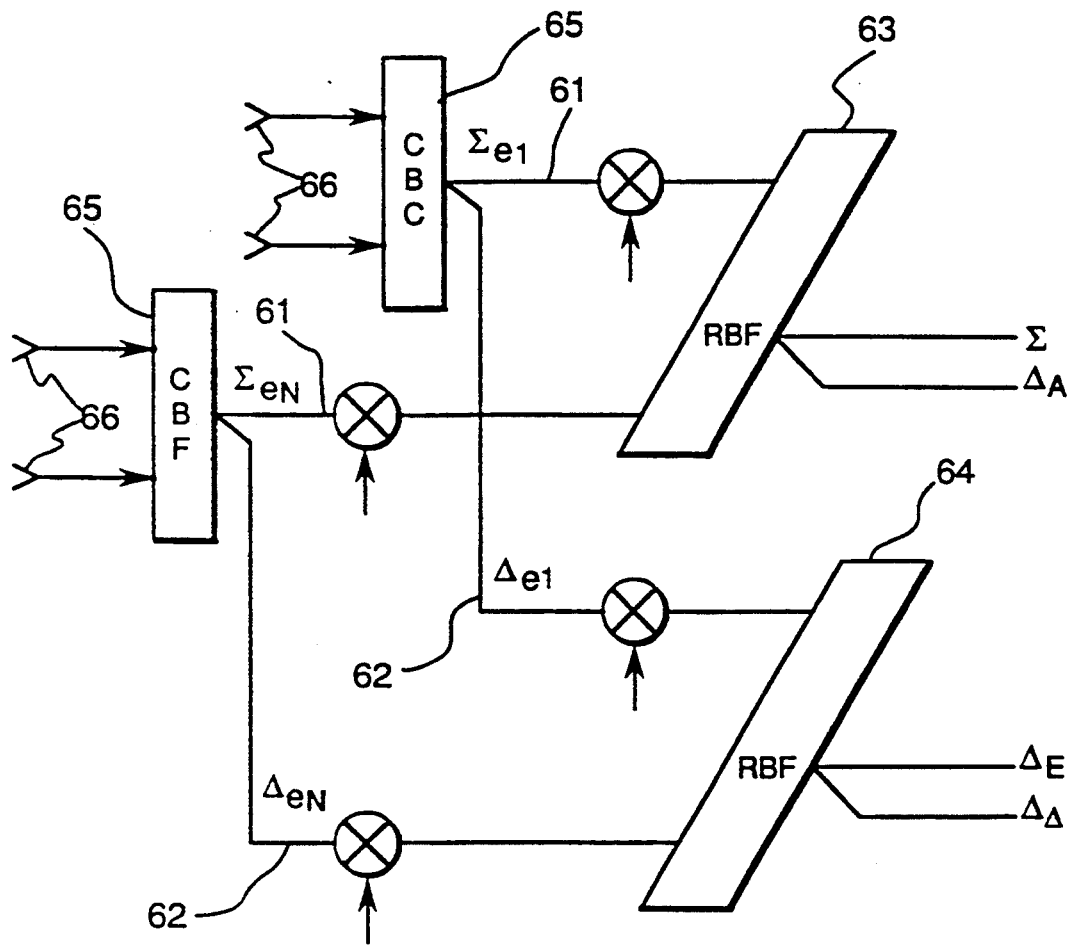
FIG. 6 is a block diagram of a monopulse radar.

This technique can also be used with a planar array where the target azimuth and elevation angles are desired, as shown in FIG. 6. In this setup, a set of sum ($\Sigma_c$) and difference ($\Delta_e$) beams are formed along the elevation axis with in put signals from each column of sensors 66 by respective column beamformers 65. The $\Sigma_e$ beams 61 may be appropriately Taylor and Bayliss weighted and then linearly combined in a row beamformer 63 to form the sum ($\Sigma = \Sigma_a \Sigma_e$) and difference ($\Delta_A = \Delta_a \Sigma_e$) beams along the azimuth axis. Similarly, the $\Delta_e$ beams 62 may be appropriately Taylor and Bayliss weighted and then linearly combined in a row beamformer 64 to form the sum ($\Delta_E = \Sigma_a \Delta_e$) and difference ($\Delta_A = \Delta_a \Delta_e$) beams along the azimuth axis. Monopulse ratios along azimuth or elevation direction can then be formed giving the azimuth and elevation DOA estimates by using equations (5) and (6), which take advantage of the separable property of the planar array patterns.

The present invention concerns cancellation of multiple mainlobe jammers in such a way that provides target detection and enables unbiased monopulse angle measurement. In order to shown the motivation for the present invention, some existing approaches for jammer cancellation are reviewed: the multiple sidelobe canceler (MSLC; see P. W. Howells, "Exploration in Fixed and Adaptive Resolution at GE and SURC," IEEE Trans. on Antennas and Propagation, AP-24, No. 5 (Sep. 1976), p. 575.), the sum-difference mainlobe canceler (MLC; see P. Applebaum and R. Wasiewicz, "Main Beam Jammer Cancellation for Monopulse Sensors", Final Tech. Report DTIC RADC-TR-86-267,Dec. 1984.), the adaptive array (see P. Applebaum, "Adaptive Arrays", Syracuse Univ. Research Corp. Rep SPL-769, June 1964 and Widrow, et al., "Adaptive Antennas Systems," Proc. IEEE, Vol. 55, Dec. 1967) and mainlobe/sidelobe jamming cancellation (see Yu and Morrow patent application Ser. No. 07/807,548 "Adaptive Digital Beamforming Architecture and Algorithm for Nulling Mainlobe and Multiple Sidelobe Radar Jammers While Preserving Monopulse Ratio Angle Estimation Accuracy" and Yu and Morrow patent application Ser. No. 07/807,546 "Combining Sidelobe Canceler and Mainlobe Canceler for Adaptive Monopulse Radar Processing").

Multiple Sidelobe Canceler (MSLC)

Figure 10:
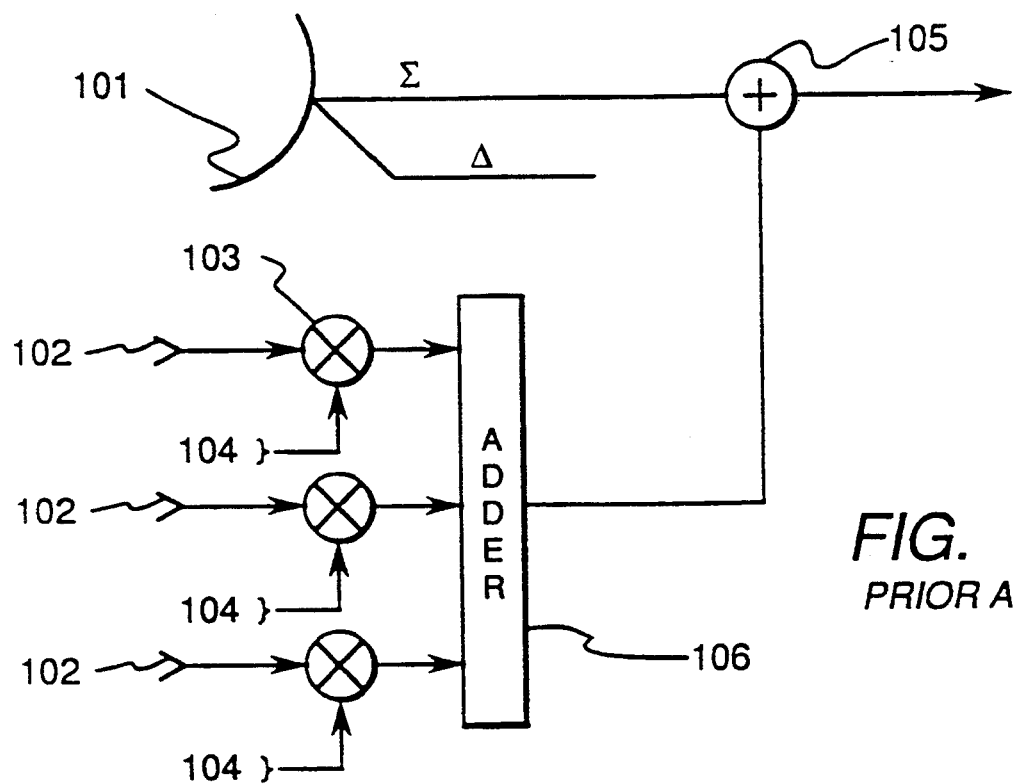
FIG. 10 is a schematic diagram showing a multiple sidelobe canceler for sum and difference channels.

The sidelobe canceler was actually the first type of adaptive array system to be deployed. It is used to reduce clutter and interference in radar systems and comprises a single high-gain antenna to which a number of small auxiliary elements are added. Both sum ($\Sigma$) and difference ($\Delta$) channels are required for monopulse processing, as illustrated in FIG. 10. The high gain antenna 101 is a typical radar antenna with a narrow beamwidth. The auxiliary elements 102 are small, low-gain, and have much wider beamwidths than the high-gain antenna. The auxiliary element output signals are multiplied by adaptive weight signals 104 at a weighting network or multiplier 103, combined by an adder 106, and then added to the high-gain antenna output by a summer 105.

Figure 11:
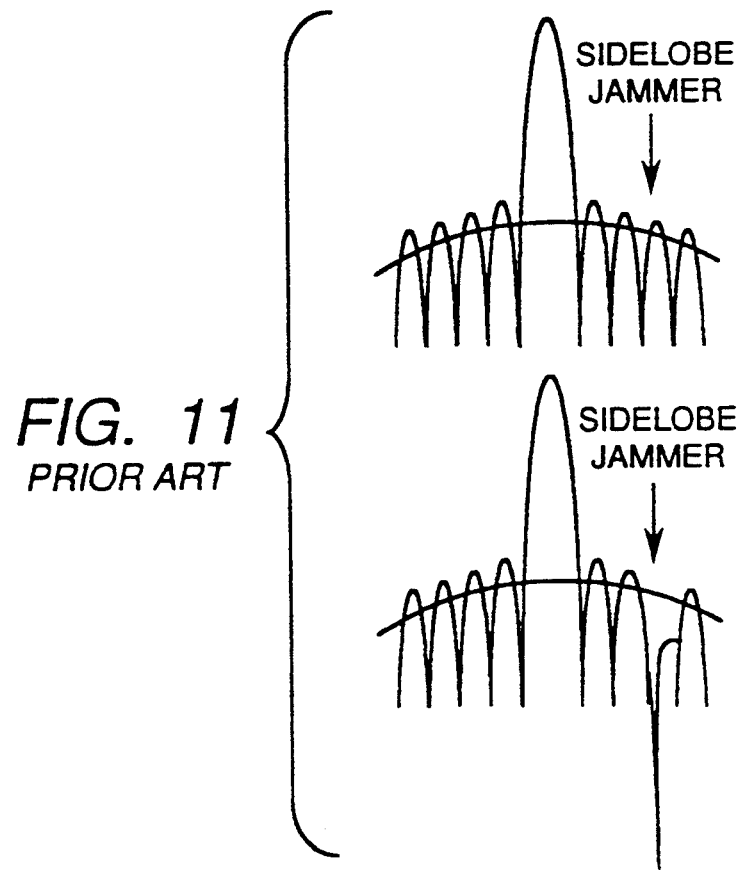
FIG. 11 is a pair of graphs showing sidelobe jammer nulling.
Figure 12:
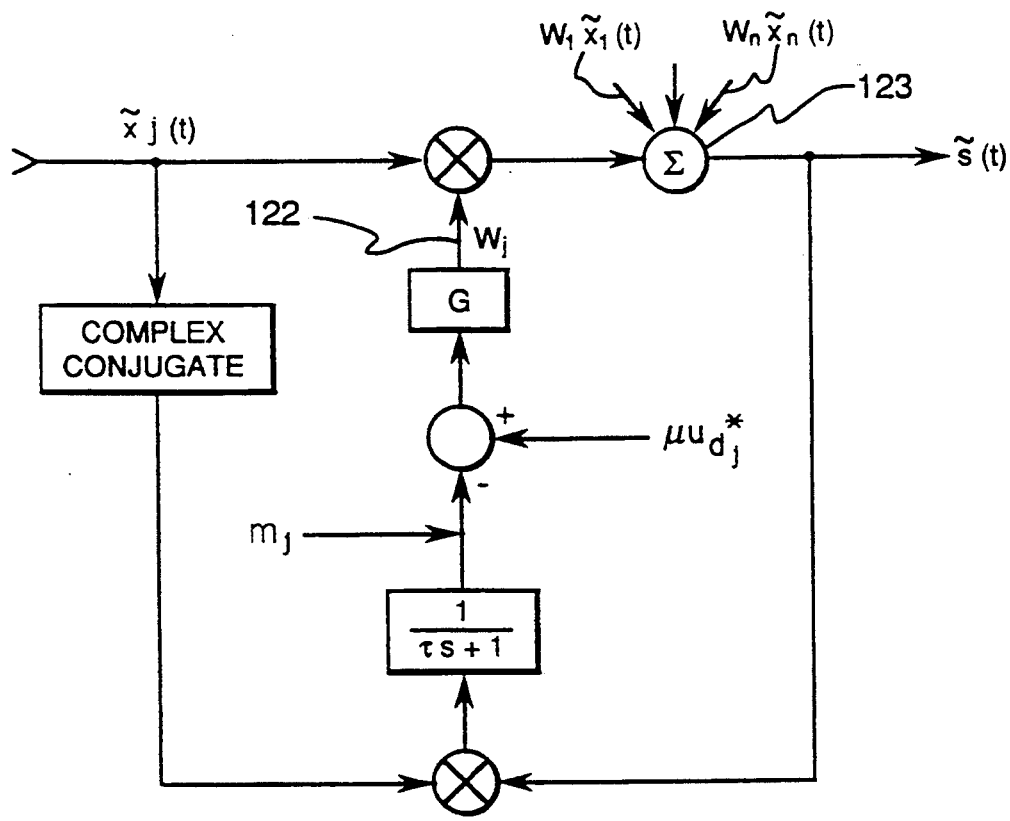
FIG. 12 is a diagram showing the Howells-Applebaum feedback loop.

By controlling the weights on the auxiliary elements adaptively, jamming in the sidelobes of the high-gain antenna can be nulled out, as illustrated in FIG. 11. This can be achieved by analog or digital circuitry. For analog implementation of radio frequencies or intermediate frequencies, the weights are adjusted using the so-called Howells-Applebaum feedback loop as illustrated in FIG. 12. This This implementation requires a feedback loop for each weight and the weight is controlled by the input signal $x_j(t)$ and the error signal at multiplier input 122. The weights will converge to the optimal weight and the jammer is thereby nulled. For digital implementation, digital samples $r_\Sigma(k)$ for the main array $r_a(k)$ and the auxiliary array are measured. Cross correlation samples between the main beam and the auxiliary array elements, as well as the auto correlation of the auxiliary elements, are estimated using the samples given by $$r_{\Sigma a} = \frac{1}{N} \sum_{k=1}^{N} r_\Sigma(k) r_a(k), \text{ and} \quad (11)$$

$$r_{aa} = \frac{1}{N} \sum_{k=1}^{N} r_a(k) r_a^H(k). \quad (12)$$

The adaptive weights for cancelling the jammers are given by $$W = r_{aa}^{-1} r_{\Sigma a} \quad (13)$$

These weights are then downloaded to the weighting network 123 for combining the auxiliary elements.

The target signal can be cancelled 1) whenever the signal enters the auxiliary elements, 2) the signal information is inaccurate, or 3) there is correlation between the desired signal and the interference signal. Constrained adaptation of the auxiliary array can e employed to prevent cancellation of the target signal. Robust methods have been employed to mitigate the effect of inaccurate signal knowledge in the adaptation process (see K. Jablon, "Steady State Analysis of the Generalized Sidelobe Canceler by Adaptive Noise Canceling Techniques," *IEEE Trans. On Antennas and Propagation*, Vol. AP-34, pp. 330–337, Mar. 1986 and Cox, R. M. Zeskind, and M. M. Owen, "Robust Adaptive Beamforming," *IEEE Trans. On Acoustics, Speech and Signal Processing*, Vol. ASSP-35, pp. 1365–1375, Oct. 1987). Methods for reducing signal cancellation due to correlated jamming have also been suggested recently (see Widrow, K. M. Duvall, P. R. Gooch, and W. C. Newman, "Signal Cancellation Phenomena in Adaptive Arrays: Causes and Cures," *IEEE Trans. on Antennas and Propagation*, Vol. Ap-30, pp. 469–478, May 1982. and T. Shan and T. Kailath, "Adaptive Beamforming for Coherent Signals and Interference," *IEEE Trans. on Acoustics, Speech and Signal Processing*, Vol. ASSP-33, pp. 527–536, June 1985).

However, the array elements do not have enough gain to cancel the mainlobe jammer (MLJ). Also, noise enters the system if the gain of the auxiliary array is increased.

Sum-Difference Mainlobe Canceler

Figure 7:
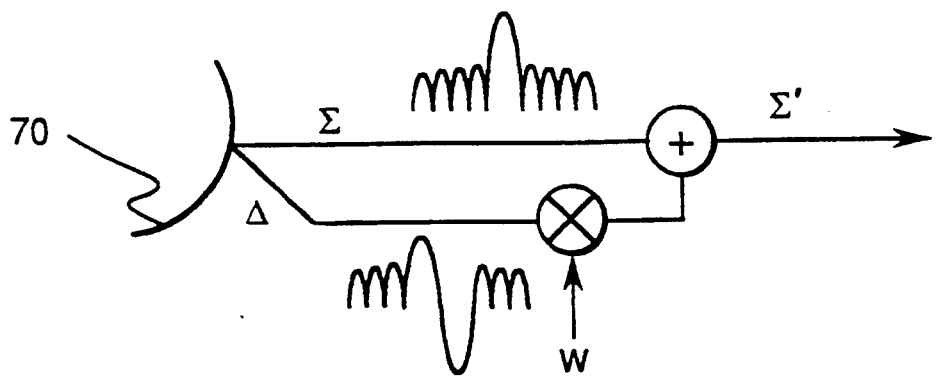
FIG. 7 is a block diagram showing a sum-difference mainlobe canceler.

The sum-difference mainlobe canceler (MLC) is shown in FIG. 7. In the example illustrated, a single antenna 70 is used to generate the sum ($\Sigma$) and difference ($\Delta$) signals. The high mainlobe gain of the difference beam can be used to null the mainlobe jammer in the sum beam.

Except at the boresight, the difference beam has a high gain and thus can be used for cancelling the mainlobe jammer without introducing excessive noise in the main antenna. Suppose the jammer is at $T_j$, where $T_j$ is the direction cosine of the jammer. The optimal weight for cancelling the jammer is given by $$W = \frac{\Sigma(T_j)}{\Delta(T_j)} \quad (14)$$

Equation 14 is a very good approximation for large jammer-to-noise ratio. The canceler weight W is actually given by the ratio of the cross-correlation between the sum and difference beam output signals to the auto-correlation of the difference beam output signals, and is approximated by equation (14) for large jammer-to-noise ratio (JNR). Since $\Sigma$ and $\Delta$ beams have comparable gain within the mainbeam, weight W would be a moderate number. If low gain auxiliary elements are used for mainlobe jamming cancellation, large weights are required for cancelling the jammer in the mainbeam, thus introducing high levels of noise into the system.

S. P. Applebaum et al. in the aforementioned Report DTIC RADC-TR-86-267 expanded on this idea and developed an architecture and algorithm for nulling the main lobe jammer while preserving the monopulse ratio. The Applebaum et al. technique makes use of the idea that the patterns of the received beam are separable in azimuth and elevation, that is, the patterns can be expressed as products of sum and difference factors in azimuth and elevation (i.e., $\Sigma = \Sigma_a \Sigma_c$, $\Delta_A = \Delta_a \Sigma_e$, $\Delta_E = -\Sigma_a \Sigma_c$, $\Delta_\Delta = \Delta_a \Delta_e$).

Figure 8:
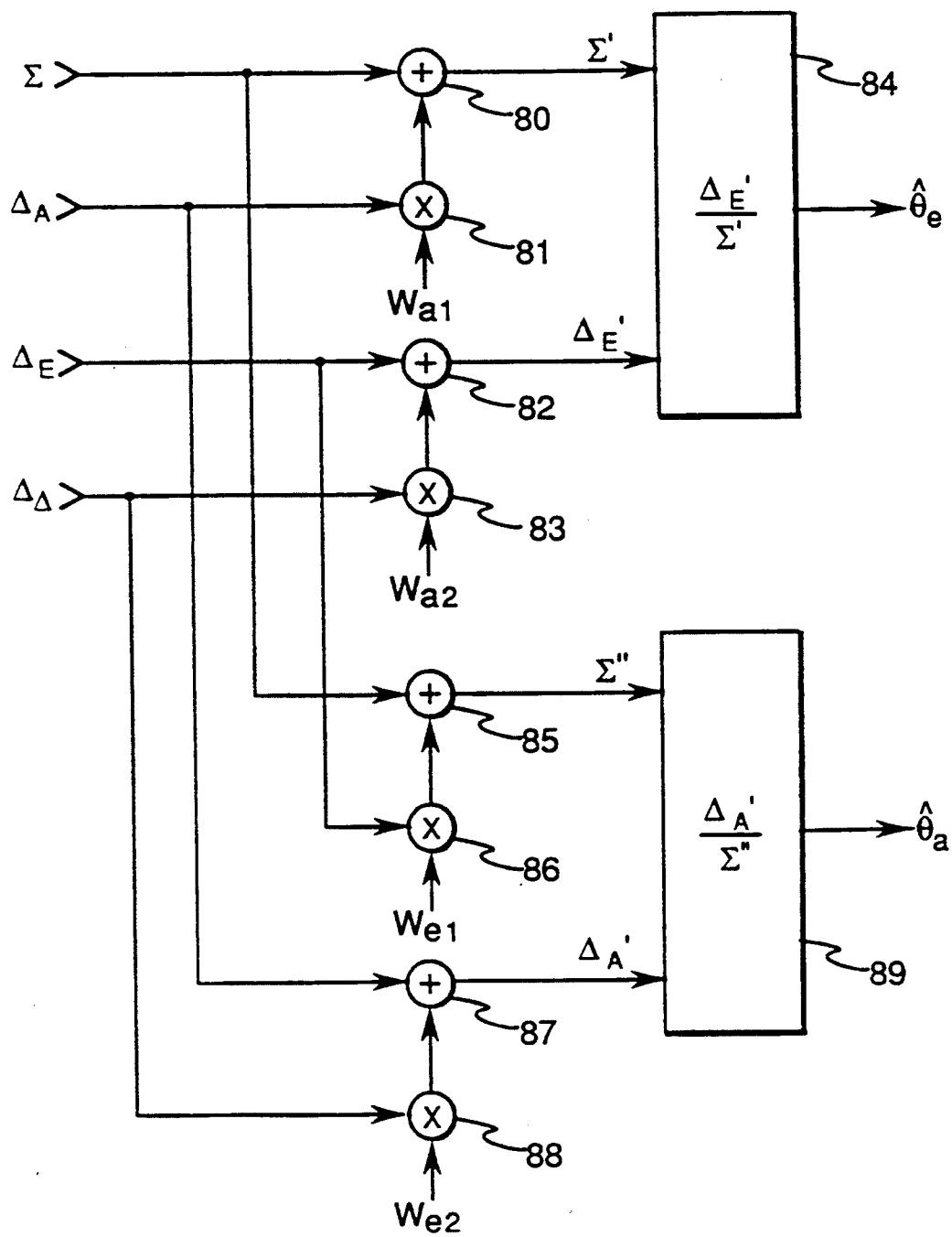
FIG. 8 is a block diagram showing a mainlobe canceler for monopulse processing.

The MLC architecture is shown in FIG. 8. In order to form the monopulse ratio along the elevation, the $\Sigma$ and $\Delta_E$ beams can be adapted by the $\Delta_A$ and $\Delta_\Delta$ beams are follows:

$$\Sigma' = \Sigma - w_{a1} \Delta_A, \quad (15)$$

and $$\Delta'_E = \Delta_E - w_{a2} \Delta_\Delta, \quad (16)$$

where $w_{a1}$ and $w_{a2}$ are adaptation weights determined as set forth, infra. The adaptation of Equation (15) is implemented with multiplier 81 and summer 80. Multiplier 81 receives as input signals adaptation weight $w_{a1}$ and the $\Delta_A$ beam, the and the product is summed in summer 80 with the $\Sigma$ beam. Similarly, the adaptation of Equation (16) is implemented with multiplier 83 and summer 82. Multiplier 83 receives as inputs adaptation weight $w_{a2}$ and the $\Delta_\Delta$ beam, and the product is summed in summer 82 and the $\Delta_E$ beam. The output signals of summers 80 and 82, i.e., $\Sigma'$ and $\Delta'_E$, are supplied to a processor 84 which generates the elevation monopulse ratio $\Delta'_E/\Sigma'$.

One mainlobe jammer can be cancelled along the azimuth by choosing the following adaptive weights $w_{a1}$ and $w_{a2}$ to minimize output signals for Equations (15) and (16):

$$w_{a1} = \frac{R_{\Sigma\Delta_A}}{R_{\Delta_A\Delta_\Delta}}, \text{ and} \tag{17}$$

$$w_{a2} = \frac{R_{\Delta_E\Delta_A}}{R_{\Delta_E\Delta_\Delta}}, \tag{18}$$

The cross-correlation $R_{\Sigma\Delta_A}$ between $\Sigma$ and $\Delta_A$ channels may be expressed as $$R_{\Sigma\Delta_A} = E[\Sigma\Delta_A^*], \tag{19A}$$

where E, the expectation, can be obtained by ensemble cross-correlation given by $$\frac{1}{N} \sum_{t=1}^{N} \Sigma(t)\Delta_A^*(t). \tag{19B}$$

Similarly, $$\begin{aligned} R_{\Delta_A\Delta_A} &= E[\Delta_A\Delta_A^*], \\ R_{\Delta_E\Delta_A} &= E[\Delta_E\Delta_A^*], \text{ and} \\ R_{\Delta_\Delta\Delta_\Delta} &= E[\Delta_\Delta\Delta_\Delta^*], \end{aligned} \tag{19C}$$

where $\Delta_A^*$ is the complex conjugate of $\Delta_A$ and $\Delta_\Delta^*$ is the complex conjugate of $\neq_\Delta$ (The symbol * represents the complex conjugate.) $w_{a1}$ should be equal to $w_{a2}$ analytically. In practice, $w_{a1}$ may not be equal to $w_{a2}$, as the weights are determined by data samples. In that case, we may force them to be equal (e.g., adapt $w_a$ in the $\Sigma$ channel and use it in the $\Delta$ channel or vice versa, or set $$w_a = \frac{w_{a1} + w_{a2}}{2},$$

i.e., choose the weight to be the average of the adpated weights). The monopulse ratio for the elevation angle estimation $f_e(\theta_e)$, and $f_e$ is the ratio of the adapted difference-elevation beam output signal to the adapted sum beam output signal, is obtained in processor 84 in the following manner:

$$\begin{aligned} f_e(\theta_e) &= \frac{\Delta_E'}{\Sigma'} = \frac{\Delta_E - w_a\Delta_\Delta}{\Sigma - w_a\Delta_A} \\ &= \frac{\Sigma_a\Delta_e - w_a\Delta_a\Delta_e}{\Sigma_a\Sigma_e - w_a\Delta_a\Sigma_e} \\ &= \frac{\Delta_e(\Sigma_a - w_a\Delta_a)}{\Sigma_e(\Sigma_a - w_a\Delta_a)} \\ &= \frac{\Delta_e}{\Sigma_e}. \end{aligned} \tag{20}$$

Thus, the monopulse ratio along the elevation direction is maintained (except at the azimuth angle where there is a jammer), and the mainlobe jammer is cancelled.

Cancellation of the mainlobe jammer and maintaining the monopulse ratio along the azimuth direction can be developed in a similar manner. The adapted sum $\Sigma$ and difference $\Delta$ beams are given by $$\Sigma'' = \Sigma - w_{e1}\Delta_E, \tag{21}$$

and $$\Delta_A' = \Delta_A - w_{e2}\Delta_\Delta, \tag{22}$$

where $w_{e1}$ and $w_{e2}$ are adaptation weights determined as set forth, infra. The adaptation of Equation (21) is implemented with multiplier 86 and summer 85. Multiplier 86 receives as input signals adaptation weight $w_{e1}$ and the $\Delta_E$ beam, and the product is summed in summer 85 with the $\Sigma$ beam. Similarly, the adaptation of Equation (22) is implemented with multiplier 88 and summer 87. Multiplier 88 receives as input signals adaptation weight $w_{e2}$ and the $\Delta_{66}$ beam, and product is summed in summer 87 with the $\Delta_A$ beam. The output signals of summers 85 and 87, i.e., $\Sigma'$ and $\Delta_A'$, are supplied to a processor 89 which generates the azimuth monopulse ratio $\Delta_E'/\Sigma'$.

The mainlobe jammer can be cancelled by choosing the following adaptive weights:

$$w_{e1} = \frac{R_{\Sigma\Delta_E}}{R_{\Delta_E\Delta_E}}, \text{ and} \tag{23}$$

$$w_{e2} = \frac{R_{\Delta_A\Delta_A}}{R_{\Delta_\Delta\Delta_\Delta}}, \tag{24}$$

where $$\begin{aligned} R_{\Sigma\Delta_E} &= E[\Sigma\Delta_E^*], \\ R_{\Delta_E\Delta_E} &= E[\Delta_E\Delta_E^*], \text{ and} \\ R_{\Delta_A\Delta_\Delta} &= E[\Delta_A\Delta_\Delta^*]. \end{aligned}$$

Similarly, we can set the weights equal $$\left(\text{e.g., } w_e = \frac{w_{e1} + w_{e2}}{2}\right).$$

The monopulse ratio for the azimuth angle $\theta_a$ estimate can then be shown to be preserved:

$$f_a(\theta_a) = \frac{\Delta_A'}{\Sigma''} = \frac{\Delta_A - w_e\Delta_\Delta}{\Sigma - w_e\Delta_E} = \frac{\Delta_a}{\Sigma_a}. \tag{25}$$

Adaptive Array

Adaptive receiving arrays for radar, which maximize the signal-to-noise ratio at the array output, were first developed by S. P. Applebaum, see Report SPL-769, supra. These arrays maximize the ratio of antenna gain in a specified scan direction to the total noise in the output signal Similar techniques have been described for communications systems by Widrow et al., supra, which minimize the means square error between the array output and a transmitted pilot signal which is known a priori at the receiver. The theory of adaptive arrays as applied t the angle measurement problem has been developed by R. C. Davis, L. E. Brennan and I. S. Reed, "Angle Estimation with Adaptive Arrays in External Noise Field," *IEEE Trans. on Aerospace and Electronic Systems*, Vol AES-12, No. 2, Mar. 1976. The Davis et al. analysis of using maximum likelihood theory of angle estimation leads naturally to the adaptive sum and difference beams.

Figure 9:
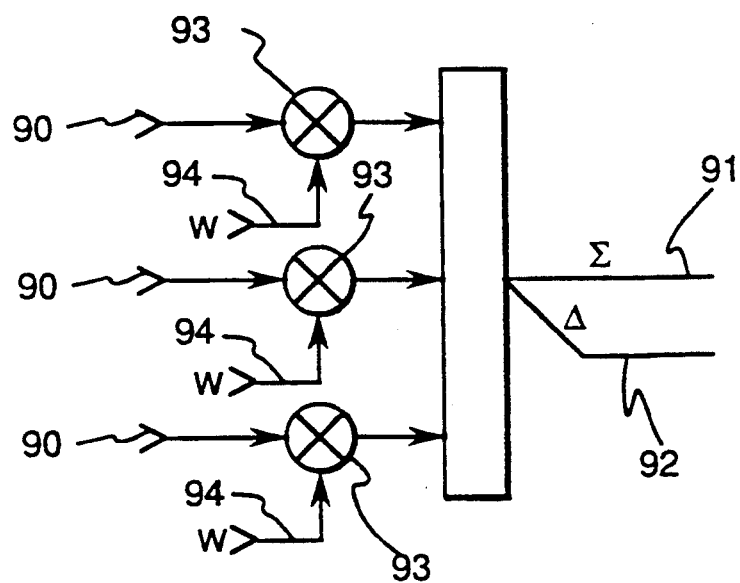
FIG. 9 is a block diagram showing an adaptive array for forming sum and difference beam output signals.

The array architecture is shown in FIG. 9. The sum and difference beams, represented by the symbols $\Sigma$ and Δ, respectively, at array outputs 91 and 92, respectively, are formed by adaptive receiving array techniques which automatically null the interference sources. Because of the adaptivity, which involves using a multiplier 93 to apply an adaptive weight 94 to antenna array signals 90, the two patterns vary with the external noise field and are distorted relative to the conventional monopulse sum and difference beams which possess even and odd symmetry, respectively, about a prescribed boresight angle. The adaptive weights for the sum and difference beams are given by $$W_\Sigma = R^{-1} W_\Sigma, \quad (26)$$

and $$S_\Delta = R^{-1} W_\Delta, \quad (27)$$

where $W_\Sigma$ and $W_\Delta$ are the nominal sum and difference weights used in a conventional monopulse system and R is the covariance matrix of the total interference, which may include jamming and noise. R can be estimated by ensemble averaging the outer-product of the data samples obtained within the observation interval. The antenna patterns are distorted with the following expressions, where S represents the target signal array response vector:

$$\Sigma(\theta) = W_\Sigma^H S \quad (28)$$
$$= W_\Sigma^H R^{-1} S, \text{ and}$$

$$\Delta(\theta) = W_\Delta^H S \quad (29)$$
$$= W_\Delta^H R^{-1} S.$$

The resulting monopulse ratio is distorted and equal to $$f(\theta) = Re\left(\frac{\Delta(\theta)}{\Sigma(\theta)}\right) \quad (30)$$
$$= Re\left(\frac{W_\Delta^H R^{-1} S}{W_\Sigma^H R^{-1} S}\right),$$

where Re signifies the real part of the express, and the ideal monopulse ratio is $$f(\theta) = Re\left(\frac{W_\Delta^H S}{W_\Sigma^H S}\right), \quad (31)$$

This technique cancels both the mainlobe and sidelobe jammers but distorts the monopulse ratio. This approach for DOA estimation has been verified by computer simulation to work well for SLJs, but performance degrades when the jammers are within the mainbeam.

Techniques for simultaneous nulling in the sum and difference channels of a monopulsed phased array using one set of adaptive weights shared by both beams can be found in L. Haupt, "Simultaneous Nulling in the Sum and Difference Patterns of a Monopulse Antenna," *IEEE Trans. on Antennas and Propagation*, Vol. Ap-32, No. 5, May 1984, pp. 486–493., Hapt, "Adaptive Nulling in Monopulse Antennas," *IEEE Trans. on Antennas and Propagation*, Vol. 36, No. 2, Feb. 1988, pp. 202–208. and B. Vu, "Simultaneous Nulling in Sum and Difference Patterns by Amplitude Control," *IEEE Trans. on Antennas and Propagation*, Vol. 34, No. 2, Feb. 1986. It should be noted that nulls may be inserted in the two patterns with the use of separate adaptive weights and controls for the sum and difference channels. However, this requires two sets of adaptive hardware. Moreover, inserting a null in the sum pattern does not automatically place a null in the difference pattern and vice versa. Thus, attempts to adapt the beams separately to null the jammers will cancel the jammers but will also distort the monopulse ratio, thus preventing use for DOA estimation. Monopulse processing for DOA estimation requires simultaneous adaptation of the sum and difference beams.

Mainlobe/Sidelobe Jamming Cancellation

The adaptive array and the MSLC work well for SLJ cancellation and the MLC works well for MLJ cancellation. These techniques can be combined for monopulse processing in a heavy jamming environment where both sidelobe and mainlobe jamming are present. The technique of combining adaptive array and MLC is disclosed in application Ser. No. 07/807,546. Another technique combining the MSLC and MLC for monopulse processing is disclosed in application Ser. No. 07/807,548. A major difference between these two inventions is that one technique uses MSLC and the other technique uses adaptive array for SLJ cancellation. Digital beam forming technology is required for the implementation of the fully adaptive array (Ser. No. 07/807,546) while low-gain, omni-directional auxiliary elements are required for the implementation of the MSLC (Ser. No. 07/807,548).

Adaptive DBF Array followed by a Mainlobe Canceler

Figure 15:
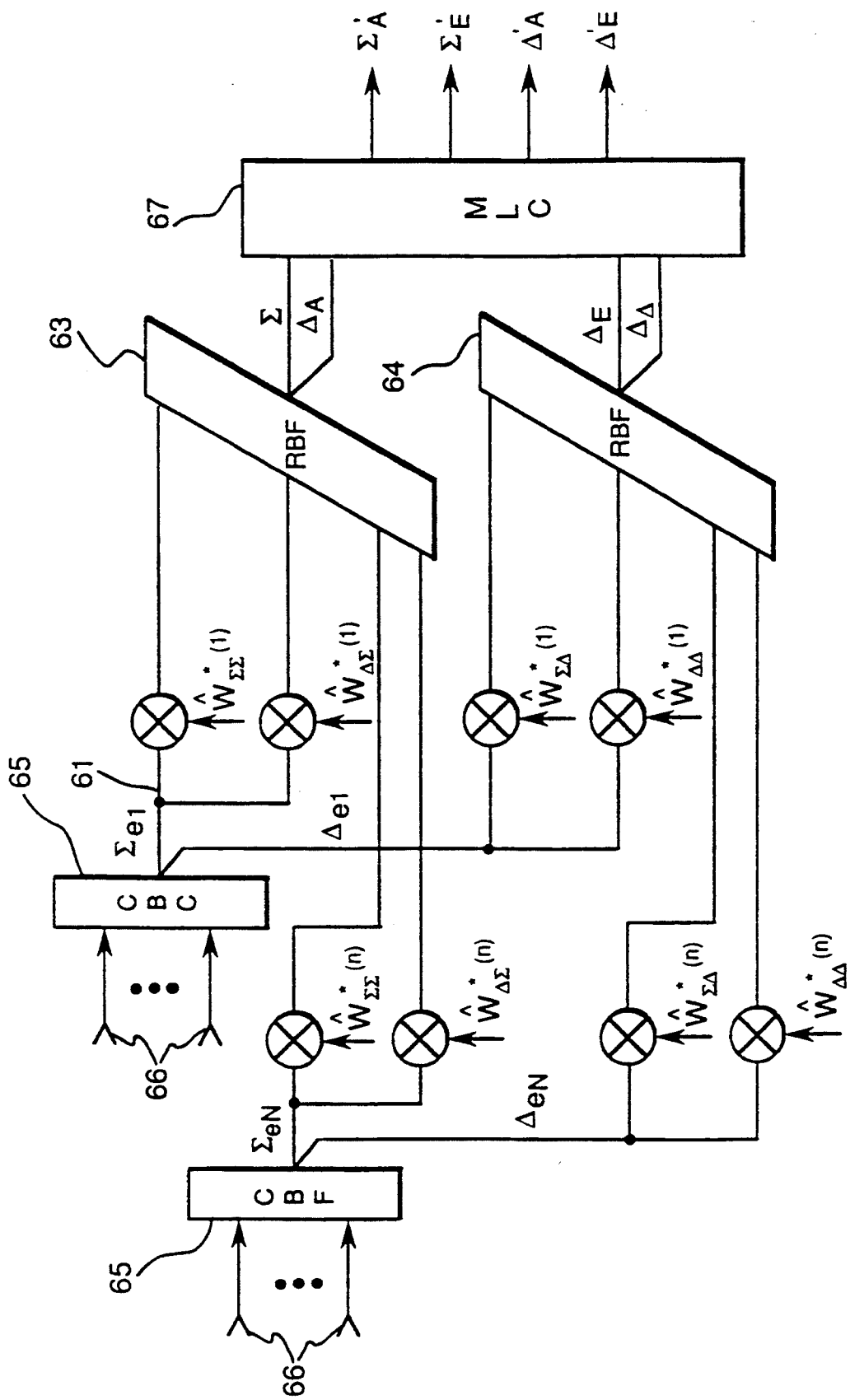
FIG. 15 is a block diagram of the architecture for combining an adaptive array with a mainlobe canceler for monopulse processing.

The fully adaptive array technique for cancelling a mainlobe and multiple sidelobe jammers is shown in FIG. 15. This technique implements a two stage digital beamforming (DBF) architecture for adaptive monopulse processing. There are N columns in the DBF array, and each column has a column beamformer 65 for combining the M elemental sensors 66 input signals. At each column, the two beams ($\Sigma_{en}$ and $\Delta_{en}$) are formed by linearly combining input signals from each set of sensors. They are then digitized and beamformed, giving $$\Sigma = W_{EE}^H \Sigma_e, \quad (32)$$

$$\Delta_A = W_{\Delta\Sigma}^H \Sigma_e \quad (33)$$

$$\Delta_C = W_{\Sigma\Delta}^H \Delta_e, \quad (34)$$

and $$\Delta_\Delta = W_{\Delta\Delta}^H \Delta_e, \quad (35)$$

where $$W_{\Sigma\Sigma} = R_{\Sigma_e \Sigma_e}^{-1} W_\Sigma, \quad (36)$$

$$W_{\Delta\Sigma} = R_{\Sigma_e \Sigma_e}^{-1} W_\Delta, \quad (37)$$

$$W_{\Sigma\Delta_e} = R_{\Delta_e \Delta_e}^{-1} W_\Sigma, \quad (38)$$

and $$W_{\Delta\Delta} = R_{\Delta_e \Delta_e}^{-1} W_\Delta, \quad (39)$$

and where $W_\Sigma$ and $W_\Delta$ are the nominal sum and difference weights. Taylor and Bayliss weights are typically used. The sample matrix inverse modifies the weights and corresponds to a nulling preprocessing responsive to jammers.

A sample matrix inverse approach for jamming cancellation will effectively form nulls responsive to jammers. If one of the jammers is within the mainbeam, a null will be found responsive to the mainlobe jammer and the mainbeam will be distorted. In order to maintain the mainbeam without distortion, the mainlobe jammer effect must be excluded from the covariance matrix estimate. This may be accomplished by using the following modified covariance matrix in forming the adpated row beamforming weights, i.e. equation (36) through equation (39):

$$R = R - P_1 J_1 J_1^H \tag{40}$$

where R is the original sample matrix, $P_1$ is the power vector of the mainlobe jammer, and $J_1$ is the array response vector of the mainlobe jammer. This modified covariance matrix does not have the information of the mainlobe jammer, and thus there will not be a null responsive to the mainlobe jammer. The power and location can be obtained by analyzing the covariance matrix, such as by using the MUSIC algorithm (R. Schmidt, "Multiple Emitter Location and Signal Parameter Estimation," *IEEE Trans. Antennas and Propagation,* Vol. AP-34, Mar. 1986.)

An alternative method for suppressing the mainlobe jammer effect is to do some prefiltering to block the mainlobe jammer. The blocking matrix B can be designed when the direction of the mainlobe jammer is known, i.e. B is orthogonal to the steering vector of the mainlobe jammer. The resulting sample vectors will thus be free of the mainlobe jammer and can then be used for covariance matrix estimates for sidelobe jammer cancellation.

The technique of preprocessing, together with an example of mainbeam constraint, is illustrated below. The covariance matrix can be decomposed into noise covariance and jamming covariance matrices as follows:

$$R = R_n + R_J \tag{41}$$

$$= \sigma_n^2 \left[ I + \sum_{k=1}^{K} (JNR)_k J_k J_k^H \right],$$

where $\sigma_n^2$ is the elemental noise variance, $(JNR)_k$ is the kth jamming-to-noise ratio, and $J_k$ is the kth jamming factor. For conventional preprocessing without mainbeam maintenance, $R^{-1}$ is applied to the vector input before forming the $\Sigma$ and $\Delta$ beams, i.e., $$\Sigma(\theta) = W_\Sigma^H S \tag{42}$$

$$= W_\Sigma^H R^{-1} S$$

$$= \frac{1}{\sigma_n^2} \left[ W_\Sigma^H S - \sum_{k=1}^{K} \frac{(JNR)_k (W_\Sigma^H J_k)}{1 + (JNR)_k N} J_k^H S \right].$$

This explicit expression for $R^{-1}$ is derived for the case of well-resolved jammers. An example of the technique to maintain the mainlobe is to apply R' instead of R in the preprocessing state where $R' = R - P_1 J_1 J_1^H$, P1 is the power estimate of the MLJ, J1 is the direction vector estimate within the mainlobe corresponding to the MLJ, $W_\Sigma$ is the conventional $\Sigma$ beam weight, and $W_\Sigma^H S$ is the ideal sum beam.

An expression for the modified $\Delta$ beam can also be derived. $J_k^H S$ has an interpretation that the beam is steered to the jammer direction. In order to maintain the $\Sigma$ beam within the mainlobe, the effect of the jammer within the mainbeam (e.g., the first jammer $J_1$) is suppressed, i.e., $$\Sigma(\theta) \approx \frac{1}{\sigma_n^2} \left[ W_\Sigma^H S - \sum_{k=2}^{K} \frac{(JNR)_k (W_\Sigma^H J_k)}{1 + (JNR)_k N} J_k^H S \right]. \tag{43A}$$

It should be noted that the summation is from $k=2$ to $k=K$. The $\Delta$ beam can also be maintained accordingly; that is, $$\Delta(\theta) = W_\Delta^H S \tag{43B}$$

$$= W_\Delta^H R^{-1} S$$

$$\approx \frac{1}{\sigma_n^2} \left[ W_\Delta^H S - \sum_{k=2}^{K} \frac{(JNR)_k (W_\Delta^H J_k)}{1 + (JNR)_k N} J_k^H S \right].$$

The product beams, i.e., two-dimensional azimuth and elevation beams are then free of SLJs but may include the MLJ. The mainbeam jammer is canceled by adapting the two-dimensional $\Sigma$ and $\Delta$ beams simultaneously. For example, in order to form the monopulse ratio in elevation, adapt the $\Sigma$ and $\Delta$ beams to cancel the MLJ simultaneously as follows:

$$\Sigma' = \Sigma - W_a \Delta_A, \tag{44}$$

and $$\Delta'_E = \Delta_E - W_a \Delta_A. \tag{45}$$

This can be done by adapting $W_a$ in the $\Sigma$ channel and using it in the $\Delta$ channel, or choosing $W_a$ to adapt to the $\Sigma$ and $\Delta$ beams simultaneously. In this way, the monopulse ratio can be shown to be preserved along the elevation axis while the jammer is nulled along the azimuth axis as follows:

$$\frac{\Delta_E'}{\Sigma'} = \frac{\Delta_e}{\Sigma_e} \tag{46}$$

The same technique can also be used to preserve the monopulse ratio along the azimuth with the mainlobe jammer canceled along the elevation.

Multiple Sidelobe Canceler followed by a Mainlobe Canceler

Figure 13A:
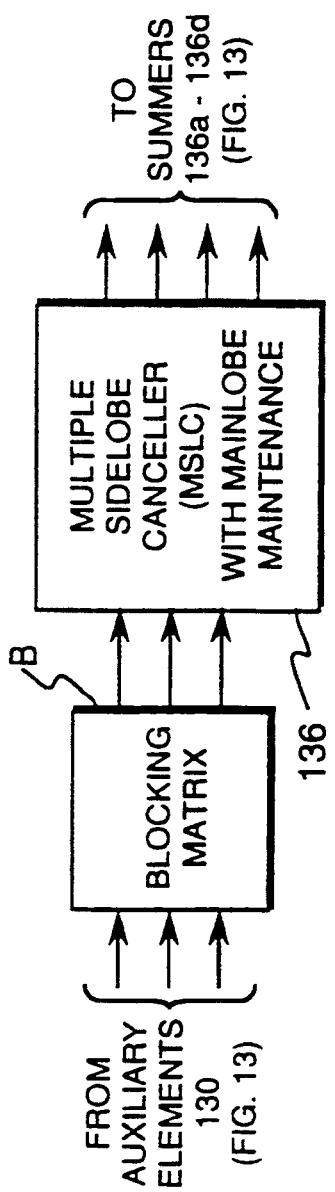
FIG. 13A is a block diagram of a modification of the mainlobe/multiple sidelobe canceler shown in FIG. 13.

FIG. 13 shows a multiple sidelobe canceler 136 cascaded with a mainlobe canceler 137 for monopulse processing by a monopulse processor 138. The main beam voltage measurements for the main antenna array 131 are given by $$r_\Sigma = \Sigma(T_x^s, T_y^s) S + \sum_{k=1}^{K} \Sigma(T_x^k, T_y^k) J_k + n_\Sigma \tag{47}$$

$$r_{\Delta A} = \Delta_A(T_x^s, T_y^s) S + \sum_{k=1}^{K} \Delta_A(T_x^k, T_y^k) J_k + n_{\Delta A}$$

-continued $$r_{\Delta E} = \Delta_E(T_x^s, T_y^s)S + \sum_{k=1}^{K} \Delta_E(T_x^k, T_y^k)J_k + n_{\Delta E}$$

$$r_{\Delta\Delta} = \Delta_\Delta(T_x^s, T_y^s)S + \sum_{k=1}^{K} \Delta_\Delta(T_x^k, T_y^k)J_k + n_{\Delta\Delta}$$

where $\Sigma, \Delta_A, \Delta_E$, and $\Delta_\Delta$ are the respective sum and difference values for the main antenna patterns, and appear on channels 132, 133, 134, and 135, respectively, while k represents the $k^{th}$ jammer signal. Output signals from multiple sidelobe canceler MSLC 136 are subtracted from patterns $\Sigma, \Delta_A, \Delta_E$, and $\Delta_\Delta$ in summers 136a, 136b, 136c, and 136d, respectively, so as to modify those patterns such that sidelobe jamming is removed. Pattern $\Sigma$ has a symmetrical profile with respect to both the azimuth and elevation with maximum gain at the boresight. Pattern $\Delta_A$ has a symmetrical profile with respect to the elevation but is antisymmetrical with respect to the azimuth. Pattern $\Delta_E$ is symmetrical with respect to the azimuth but is antisymmetrical with respect to the elevation. Pattern $\Delta_\Delta$ is antisymmetrical with respect to both axes and has a zero response at the boresight. S and $\{J_k\}$ are the signal and jamming vectors, respectively, while $n_\Sigma$, $n_{\Delta A}$, $n_{\Delta E}$, and $n_{\Delta\Delta}$ are the measurement noise. The voltage measurements $\{r_{al}\}$ for the auxiliary antenna array, which is comprised of elements 130, are given by $$r_{al} = G_{al}(T_x^s, T_k^s)S + \sum_{k=1}^{K} G_{al}(T_x^k, T_y^k)J_k n_{al} \quad l = 1, 2, \ldots, N \quad (48)$$

where $\{G_{al}\}$ are the elemental gains; $\{n_{al}\}$ is the elemental noise; $r_{al}$ are used for SLJ cancellation; $r_\Sigma r_{\Delta A}, r_{\Delta E}$, and $r_{\Delta\Delta}$ are used for target detection and angle estimation using monopulse processing.

When there is no jamming and noise, the estimation procedure can be derived by noting that the patterns are separable in azimuth and elevation. They can be expressed as the following product factors:

$$\Sigma(T_x, T_y) = \Sigma_a(T_x)\Sigma_e(T_y)$$

$$\Delta_A(T_x, T_y) = \Delta_a(T_x)\Sigma_e(T_y)$$

$$\Delta_E(T_x, T_y) = \Sigma_a(T_x)\Delta_e(T_y)$$

$$\Delta_\Delta(T_x, T_y) = \Delta_a(T_x)\Delta_e(T_y) \quad (49)$$

The target DOA can be obtained exactly as $$f_a(\theta_a) = \frac{\Delta_A(T_x, T_y)}{\Sigma(T_x, T_y)} \quad (50)$$

$$= \frac{\Delta_a(T_x)}{\Sigma_a(T_x)}$$

and $$f_e(\theta_e) = \frac{\Delta_E(T_x, T_y)}{\Sigma(T_x, T_y)} \quad (51)$$

$$= \frac{\Delta_e(T_x)}{\Sigma_e(T_x)}$$

In the presence of jamming, cancellation techniques can be applied before measurements are used for monopulse processing. The SLJs can be cancelled using input signals from the auxiliary array 130. Consider the following adapted main beam output signals:

$$r'_\Sigma = r_\Sigma - W_\Sigma^H r_a$$

$$r'_{\Delta A} = r_{\Delta A} - W_{\Delta A}^H r_a$$

$$r'_{\Delta E} = r_{\Delta E} - W_{\Delta E}^H r_a$$

$$r'_{\Delta\Delta} = r_{\Delta\Delta} - W_{\Delta\Delta}^H r_a \quad (52)$$

Figure 14:
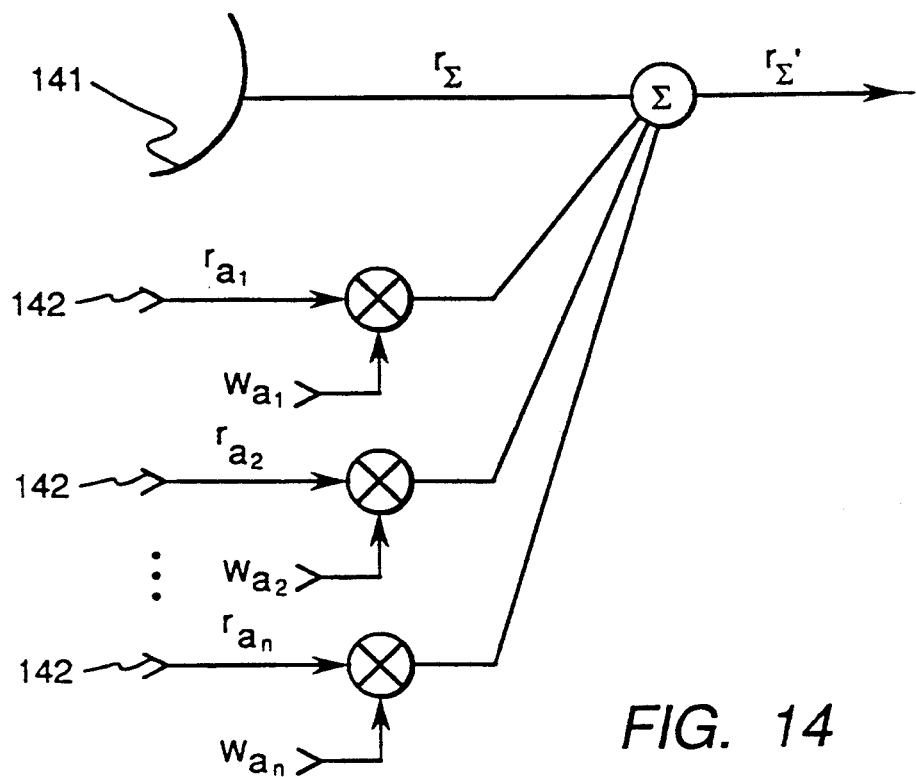
FIG. 14 is a diagram showing mainlobe maintenance in conjunction with a multiple sidelobe canceler.

The optimal weights for minimizing the interference output for each of the main beams are given by $$W_\Sigma = R_{aa}^{-1} R_{a\Sigma}$$

$$W_{\Delta A} = R_{aa}^{-1} R_{a\Delta A}$$

$$W_{\Delta E} = R_{aa}^{-1} R_{a\Delta E}$$

$$W_{\Delta\Delta} = R_{aa}^{-1} R_{a\Delta\Delta} \quad (53)$$

where an appropriate mainlobe maintenance or a constrained adaptive procedure is imposed. For example, this can be achieved by measuring the mainlobe jammer contribution in the covariance matrix estimation. This procedure is shown in FIG. 14. The voltage measurement model for the main antenna 141 and the signal at the auxiliary antenna signal 142 is given by:

$$\gamma_E = \sum_{k=1}^{K} g_\Sigma(T_j^k)J_k + n_\Sigma, \text{ and} \quad (54)$$

$$\gamma_a = \sum_{k=1}^{K} a_a(T_j^k)J_k + n_a \quad (55)$$

while the covariance matrix and cross-correlation matrix are given by $$R_{aa} = \sum_{k=1}^{K} g_a(T_j^k)g_a^M(T_j)P_k - \sigma^2 I, \text{ and} \quad (56)$$

$$R_{a\Sigma} = \sum_{k=1}^{K} g_a(T_j^k) g_\Sigma^*(T_j^k)P_k, \quad (57)$$

where $P_k$ is the power representation of the $k^{th}$ jammer, $\sigma^2$ is the noise power and I is the identity matrix. $R_{aa}$ can be analyzed to get an estimate of the jammer angle and power. Specifically, the eigenvalue decomposition of $R_{aa}$ is given as $$R_{aa} = \sum_{i=1}^{N} \lambda_i q_i q_i^H \quad (58)$$

where $\lambda_i$, $q_i$ are the eigenvalue-eigenvector pairs. If there are K jammers, K of the eigenvalues should be significant with respect to the rest, and the noise subspace $E_N = [g_{k+1} \ldots g_n]$ should be orthogonal to the jammer manifold, i.e.

$$E_N^M g_a(T_j) = 0 \quad (59)$$

The above Equation (59) can be solved for a set of jammer angles $\{T_j\}$. One of them is within the mainbeam (if there is a mainlobe jammer). Let the directional cosine of the COA of the mainlobe jammer be $T_1$. The power of the mainlobe jammer can then be solved by equating the jammer part of the covariance matrix and the power representation, i.e.

$$\sum_{k=1}^{K} g_a^{(k)} P_k = \sum_{k=1}^{K} (\lambda_k - \sigma^2) q_k g_k^M \quad (60)$$

It should be noted that $g_a^{(k)} = g_a(T_j^k)$ is used for convenience. $P_k$ can be solved by using the following set of linear equations $$\lambda_l - \sigma^2 = \sum_{k=1}^{K} (q_k^H g_a^{(k)})(g_a^{(k)} q_k) P_k \quad l = 1, 2, \ldots K \quad (61)$$

Then the jammer response format $g_a^{(k)}$ and the power $P_k$ can be determined for each of the K jammers. If one of the jammers is within the mainbeam, we can remove it from the covariance matrix expression, that is, the modified covariance matrix and cross-covariance matrix is then given by:

$$R_{aa} = R_{aa} - P_1 g_a^{(1)} g_a^{(1)H}$$

$$R_{a\Sigma} = R_{a\Sigma} - P_1 g_a^{(1)} g_\Sigma^* \quad (62)$$

The modified covariance matrices can then be used for adaptive weight computations as before.

Another mainlobe maintenance procedure is to spatially filter out the mainlobe jammer in the auxiliary array. This procedure involves modifying the system of FIG. 13 in the manner shown in FIG. 13a; i.e., by constructing a blocking matrix B such that the mainlobe jammer is filtered out of the signals supplied by the auxiliary array. If $$\gamma'_a = B\gamma_a \quad (63)$$

B has the property of nulling out the mainlobe jammers, i.e.

$$B g_a(T_j) = 0 \quad (64)$$

The spatial filtered samples can then be used for covariance matrix estimation and adaptive weight computation.

The main channel output signals are thus free of SLJ but may include MLJ. The MLJ cancellation technique can be applied as before, leading to the following:

$$r''_{\Sigma E} = r'_\Sigma - w_{a1} r'_{\Delta A}$$

$$r''_{\Sigma E} = r'_{\Delta E} - w_{a2} r'_{\Delta\Delta}$$

$$r''_{\Sigma A} = r'_\Sigma - w_{e1} r'_{\Delta E}$$

$$r''_{\Delta A} = r'_{\Delta A} - w_{e2} r'_{\Delta\Delta} \quad (65)$$

The optimal weights for suppressing the MLJ can be derived to be $$w_{a1} = \frac{E[r_\Sigma' r_{\Delta A}'^*]}{E[r_{\Delta A}' r_{\Delta A}'^*]} \quad (66)$$

$$w_{a2} = \frac{E[r_{\Delta E}' r_{\Delta\Delta}'^*]}{E[r_{\Delta\Delta}' r_{\Delta\Delta}'^*]}$$

$$w_{e1} = \frac{E[r_\Sigma' r_{\Delta E}'^*]}{E[r_{\Delta E}' r_{\Delta E}'^*]}$$

$$w_{e2} = \frac{E[r_{\Delta A}' r_{\Delta\Delta}'^*]}{E[r_{\Delta\Delta}' r_{\Delta\Delta}'^*]}$$

In order to evaluate the performance of the technique, the antenna patterns and the monopulse ratio are derived. The antenna patterns are the response due to the testing signal and are given by $$\Sigma_E'' = (\Sigma S - w_{e1}\Delta_A S) - (W_\Sigma^H - w_{a1} W_{\Delta A}^H) G_a S \quad (67)$$

$$\approx (\Sigma S - w_{e1} \Delta_A S)$$

$$\Delta_E'' \approx (\Delta_E S - w_{e2}\Delta_\Delta S)$$

$$\Sigma_A'' \approx (\Sigma S - w_{e1}\Delta_E S)$$

$$\Delta_A'' \approx (\Delta_A S - w_{e2}\Delta_\Delta S)$$

In each case, input from the auxiliary array is negligible as the auxiliary array gains are very much lower than the main antenna gains. The monopulse ratios for the elevation and azimuth angle estimation are given by $$f_e'(\theta_e) = Re\left\{ \frac{\Delta_E S - w_{a2}\Delta_\Delta S}{\Sigma S - w_{a1}\Delta_\Delta S} \right\} \quad (68)$$

$$= Re\left\{ \frac{\Sigma_d(T_x^s)\Delta_e(T_y^s) - w_{a2}\Delta_d(T_x^s)\Delta_e(T_y^s)}{\Sigma_d(T_x^s)\Sigma_e(T_y^s) - w_{a1}\Delta_d(T_x^s)\Delta_e(T_y^s)} \right\}$$

$$= Re\left\{ \frac{\Delta_e(T_y^s)(\Sigma_d(T_x^s) - w_{a2}\Delta_d(T_x^s))}{\Sigma_e(T_y^s)(\Sigma_d(T_x^s) - w_{a1}\Delta_d(T_x^s))} \right\}$$

$$= \frac{\Delta_e(T_y^s)}{\Sigma_e(T_y^s)} \text{ (if } w_{a1} = w_{a2}\text{)}$$

and $$f_a'(\theta_a) = Re\left\{ \frac{\Delta_A S - w_{e2}\Delta_\Delta S}{\Sigma S - w_{e1}\Delta_\Delta S} \right\} \quad (69)$$

$$= \frac{\Delta_d(T_x^s)(\Sigma_a(T_y^s) - w_{e2}\Delta_e(T_y^s))}{\Sigma_d(T_x^s)(\Sigma_e(T_y^s) - w_{e1}\Delta_e(T_y^s))}$$

$$= \frac{\Delta_d(T_x^s)}{\Sigma_d(T_x^s)} \text{ (if } w_{e1} = w_{e2}\text{)}$$

Thus monopulse ratios are preserved, and jamming is cancelled.

Simultaneous Multibeam Approach for Cancelling Multiple Mainlobe Jammers

The technique described here for the present invention is developed in the context of nulling two MLJs. It can be extended easily for more than two mainlobe jammers by using more simultaneous beams. Furthermore, while for simplicity purpose this disclosure concentrates on multiple mainlobe jammer cancellation, the present invention can also be extended to incorporate simultaneous multiple sidelobe cancellation by using adaptive array (in the manner described in the foregoing section "Adaptive DBF Array followed by a Mainlobe Canceler") or auxiliary elements (in the manner described in the foregoing section "Multiple Sidelobe Canceler followed by a Mainlobe Canceler").

Figure 16:
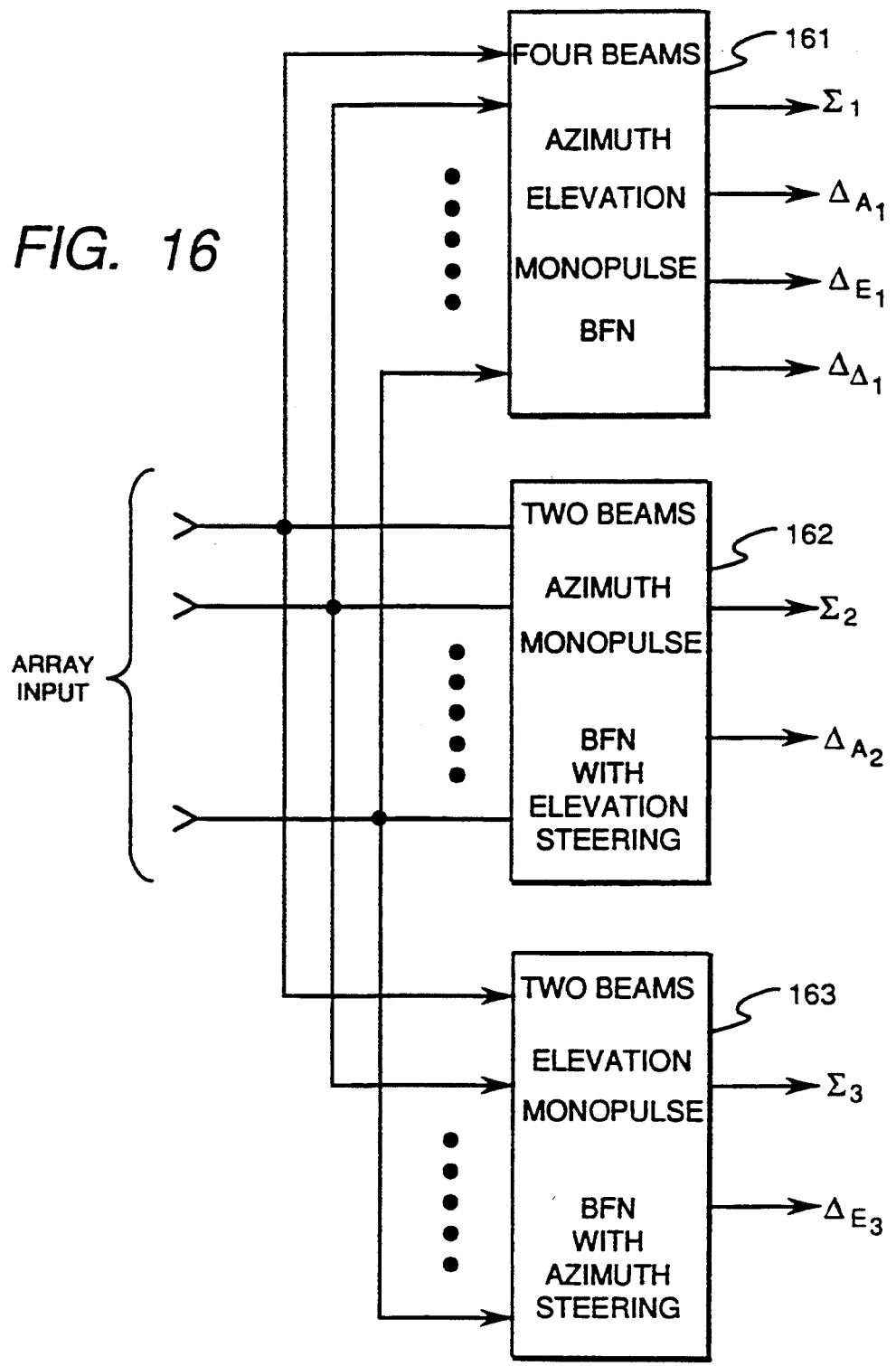
FIG. 16 is a diagram of a beamforming front end for processing three simultaneous received beams into eight simultaneous reception beams in accordance with the invention.

Consider a phase array or digital beam forming radar system 160, shown in FIG. 16, which extends the monopulse principle to multiple beams. Additional beams provide the additional degrees of freedom required for the adaptive technique to null multiple jammers. In order to preserve orthogonality the beams formed in transmission must be separated by one null beamwidth. Upon reception the patterns of these beams may be expressed as products of sum and difference factors in azimuth and elevation.

To simplify the disclosure, consider the problem of two mainlobe jammers. Nulling both jammers and preserving the monopulse ratio requires three sets of beams at the receiver—a nominal set, a set at one elevation null beamwidth away from the nominal set, and another set at one azimuth null beamwidth away from the nominal set. This can be achieved by using those beamforming networks (BFN) for simultaneous beamforming, as illustrated in FIG. 16. A first BFN 16 generates a nominal full set of monopulse beams, i.e. $\Sigma_1$, $\Delta_{A1}$, $\Delta_{E1}$ and $\Delta_{\Delta 1}$ beams. The second BFN 162 generates a set of two beams $\Sigma_2$ and $\Delta_{A2}$ which is steered one null beamwidth along azimuth away from the boresight of the nominal set. The third BFN 163 generates a set of two beams $\Sigma_3$ and $\Delta_{A3}$ which is steered one null beamwidth along elevation away from the boresight of the nominal set. Each BFN comprises a column beamforming network (CBF) followed by a row beamforming network (RBF) as indicated in FIG. 15. The resulting patterns are thus separable in azimuth and elevation because of the orthogonal structure of the BFN. The following antenna patterns which may be produced by the beamforming networks shown in FIG. 16 can be expressed as follows:

$$\Sigma_1(T_x,T_y)=\Sigma_d(T_x)\Sigma_d(T_y)$$

$$\Delta_{A1}(T_x,T_y)=\Delta_d(T_x)\Sigma_d(T_y)$$

$$\Delta_{E1}(T_x,T_y)=\Sigma_d(T_x)\Delta_d(T_y)$$

$$\Delta_{\Delta 1}(T_x,T_y)=\Delta_d(T_x)\Delta_d(T_y)$$

$$\Sigma_2(T_x,T_y)=\Sigma_d(T_x)\Sigma_d(T_y-T_{y0})$$

$$\Delta_{A2}(T_x,T_y)=\Delta_d(T_x)\Sigma_d(T_y-T_{y0})$$

$$\Sigma_3(T_x,T_y)=\Sigma_d(T_x-T_{x0})\Sigma_d(T_y)$$

$$\Delta_{E3}(T_x,T_y)=\Sigma_d(T_x-T_{x0})\Delta_d(T_y)$$

$\Sigma_1$ has a symmetrical profile with respect to both the azimuth and elevation directions with maximum gain at the bore sight. $\Delta_{A1}$ has a symmetrical profile with respect to the elevation direction but is anti-symmetrical with respect to the azimuth direction. $\Delta_{E1}$ is symmetrical with respect to the azimuth direction but is anti-symmetrical with respect to the elevation direction. $\Delta_{\Delta 1}$ is anti-symmetrical with respect to both directions and has a zero response at the boresight. $\Sigma_2$ and $\Delta_{A2}$ are steered to $T_{y0}$ where $T_{y0}$ is one null beamwidth away from the boresight along the $T_y$ direction. Similarly, $\Sigma_3$ and $\Delta_{E3}$ are steered to $T_{x0}$ where $T_{x0}$ is one null beamwidth away from the boresight along the $T_x$ direction.

The monopulse ratios for azimuth and elevation angle estimation are given by:

$$f_A(T_x,T_y) = \frac{\Delta_{A1}(t_x,T_y)}{\Sigma_1(T_x,T_y)} \quad (71)$$

$$= \frac{\Delta_d(T_x)}{\Sigma_d(T_x)}$$

and $$f_E(T_x,T_y) = \frac{\Delta_{e1}(T_x,T_y)}{\Sigma_1(T_x,T_y)} \quad (72)$$

$$= \frac{\Delta_d(T_y)}{\Sigma_d(T_y)}$$

This derivation is without jammers. Note that for product patterns the azimuth monopulse ratio $f_A$ is independent of $T_y$ and the elevation monopulse ratio $f_E$ is independent on $T_x$.

Figure 17:
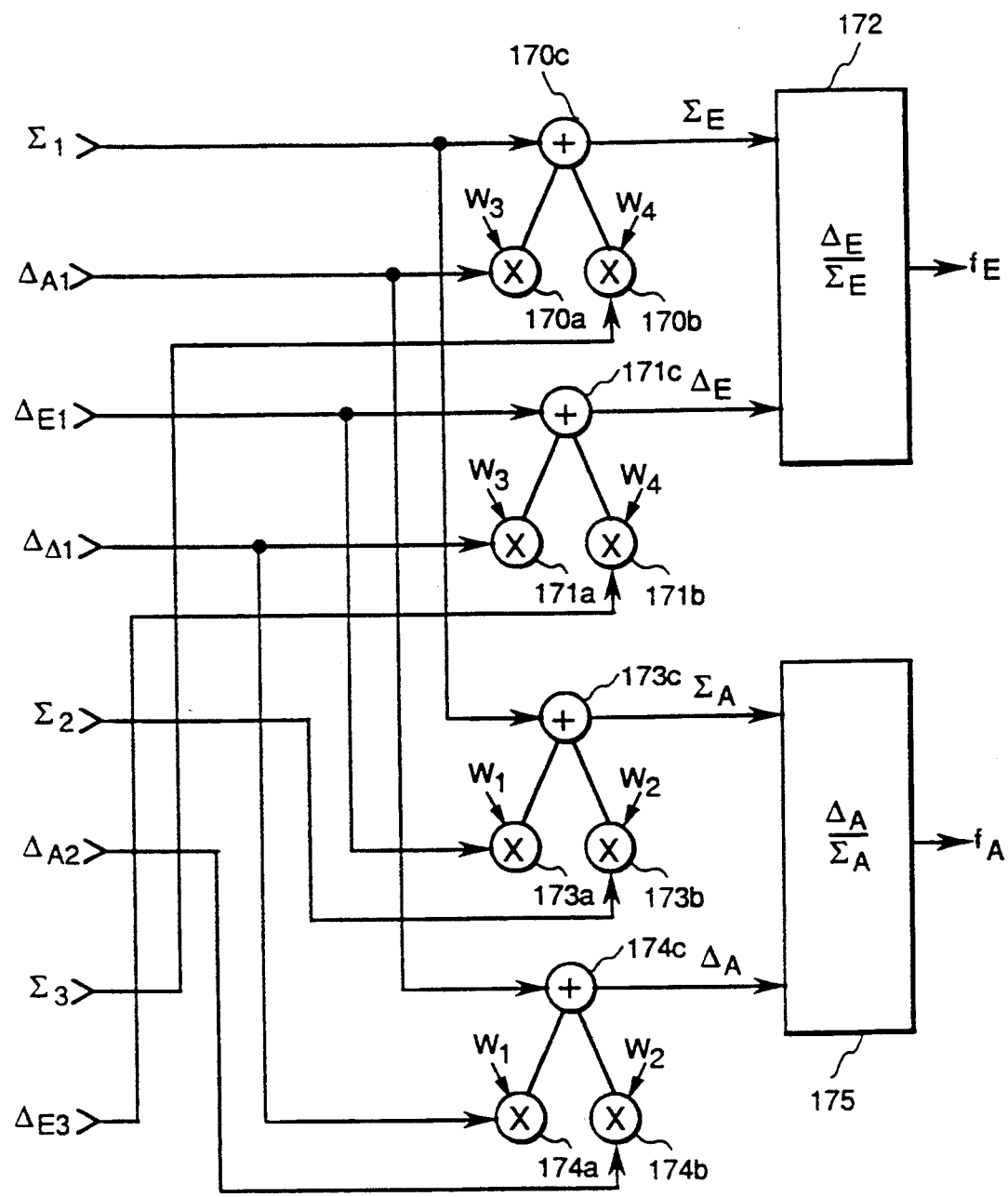
FIG. 17 is a block diagram of a canceller for two mainlobe jammers in accordance with the invention.

For nulling two MLJs, two perturbation beams are required. This can be achieved as follows, and as shown in FIG. 17:

$$\Sigma_A = \Sigma_1 - w_1\Delta_{E1} - w_2\Sigma_2$$

$$\Delta_A = \Delta_{A1} - w_1\Delta_{\Delta 1} - w_2\Delta_{A2}$$

$$\Sigma_E = \Sigma_1 - w_e\Delta_{A1} - w_r\Sigma_3 \quad (73)$$

where $\{w_i\}$ are the optimal weights for suppressing the MLJs. These adaptive weights can be determined by using conventional correlation processing, in a manner similar to that described for the single mainlobe canceler, supra. Note that we impose the same adaptive weights for $\Sigma_A$ and $\Delta_A$. Similarly the same adaptive weights are used for forming $\Sigma_E$ and $\Delta_E$.

The four adaptations of Equation (73) are implemented as shown in FIG. 17. Multiplier 170a receives as input signals adaptation weight $w_3$ and the $\Delta_{A1}$ beam, and multiplier 170b receives as input signals adaptation weight $w_4$ and the $\Sigma_3$ beam; these two products are summed in summer 170c with the $\Sigma_1$ beam to produce perturbation beam $\Sigma_g$. Multiplier 171a receives as input signals adaptation weight $w_3$ and the $\Delta_{\Delta 1}$ beam, and multiplier 171b receives as input signals adaptation weight $w_4$ and the $\Delta_{E3}$ beam; these two products are summed in summer 171c with the $\Delta_{E1}$ beam to produce perturbation beam $\Delta_E$. The output signals of summers 170c and 171c, i.e. perturbation beams $\Sigma_E$ and $\Delta_E$, are supplied to processor 172 which generates the elevation monopulse ratio $f_E=\Delta_E/\Sigma_E$.

Similarly, multiplier 173a receives as input signals adaptation weight w, and the $\Delta_{E1}$ beam, and multiplier 173b receives as input signals adaptation weight $w_2$ and the $\Sigma_2$ beam; these two products are summed in summer 173c with the $\Sigma_1$ beam to produce perturbation beam $\Sigma_A$. Multiplier 174a receives as input signals adaptation weight $w_1$ and the $\Delta_{\Delta 1}$ beam, and multiplier 174b receives as input signals adaptation weight $w_2$ and the $\Delta_{A2}$ beam; these two products are summed in summer 174c with the $\Delta_{A1}$ beam to produce perturbation beam $\Delta_A$. The output signals of summers 173c and 174c, i.e. perturbation beams $\Sigma_A$ and $\Delta_A$, are supplied to processor 175 which generates the elevation monopulse ratio $f_A=\Delta_A/\Sigma_A$.

To verify that the cancellation technique works well in preserving the monopulse angle estimation accuracy, the adapted antenna patterns and the resulting monopulse ratios are derived as follows:

$$f_A(T_x, T_y) = \frac{\Delta_A(T_x, T_y)}{\Sigma_A(T_x, T_y)} \qquad (74)$$

$$= \frac{\Delta_d(T_x)(\Sigma_d(T_y) - w_1\Delta_d(T_y) - w_2\Sigma_d(T_y - T_{y0}))}{\Sigma_d(T_x)(\Sigma_d(T_y) - w_1\Delta_d(T_y) - w_2\Sigma_d(T_y - T_{y0}))}$$

$$= \frac{\Delta_d(T_x)}{\Sigma_d(T_x)}$$

Note that the adapted patterns can be expressed in two factors. One factor is responsible for cancelling the MLJs. This factor, being common for both the numerator and denominator, is cancelled when forming the monopulse ratio. Similarly for the elevation monopulse processing, $\Sigma_E$ and $\Delta_E$ have a common factor which can be cancelled when forming the monopulse ratio. Thus the elevation monopulse ratio is preserved as follows:

$$f_E(T_x, T_y) = \frac{\Delta_E(T_x, T_y)}{\Sigma_E(T_x, T_y)} \qquad (75)$$

$$= \frac{\Delta_d(T_y)(\Sigma_d(T_y) - w_3\Delta_d(T_y) - w_4\Sigma_d(T_x - T_{x0}))}{\Sigma_d(T_y)(\Sigma_d(T_y) - w_3\Delta_d(T_x) - w_4\Sigma_d(T_x - T_{x0}))}$$

$$= \frac{\Delta_d(T_y)}{\Sigma_d(T_y)}$$

Note that for multipath mainlobe jamming, only six simultaneous beams are required. As the azimuth angles for the two coherent jammers are the same, only one beam is required to null the two jammers along the elevation for elevation monopulse processing, i.e.

$$\Sigma_E = \Sigma_1 - w_3 \Delta_{A1}$$

$$\Delta_E = \Delta_{E1} - w_3 \Delta_{A1} \qquad (76)$$

Figure 18:
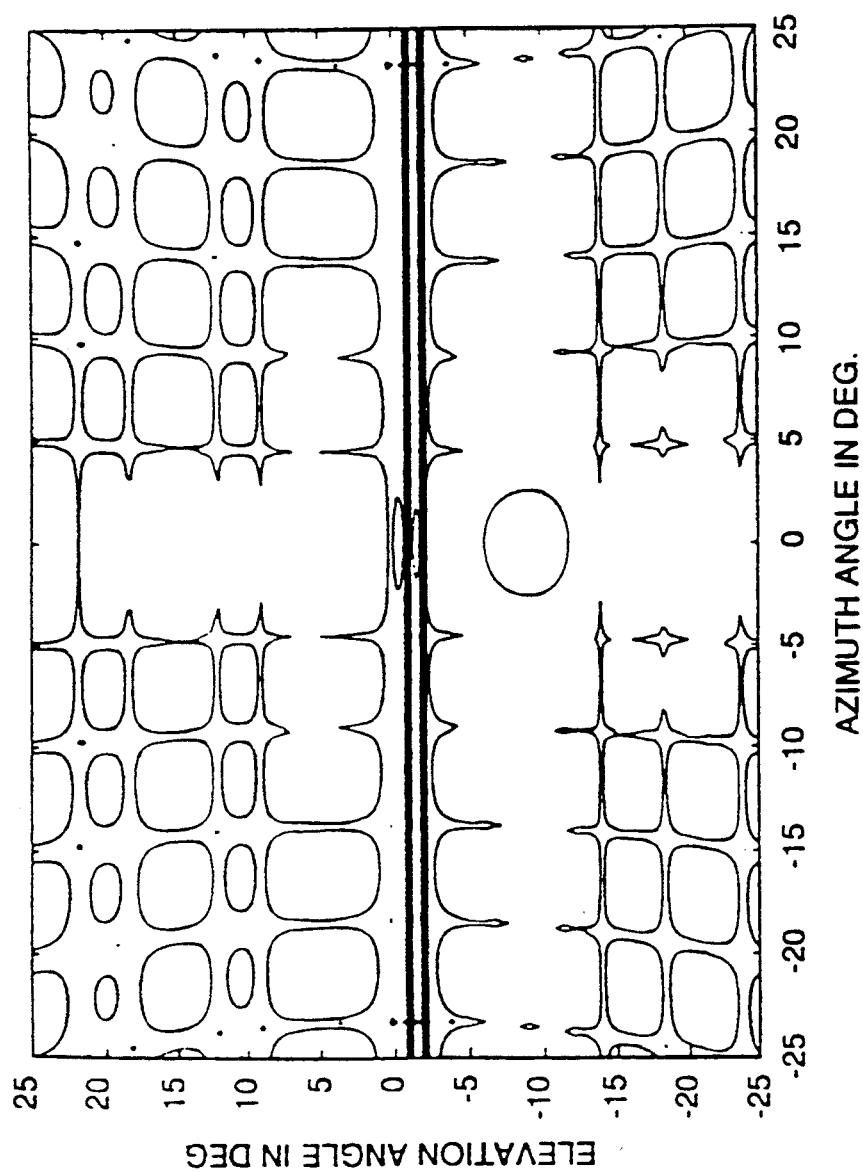
FIG. 18 is a graph showing an adapted sum azimuth beam pattern for a jamming scenario in accordance with the invention.
Figure 19:
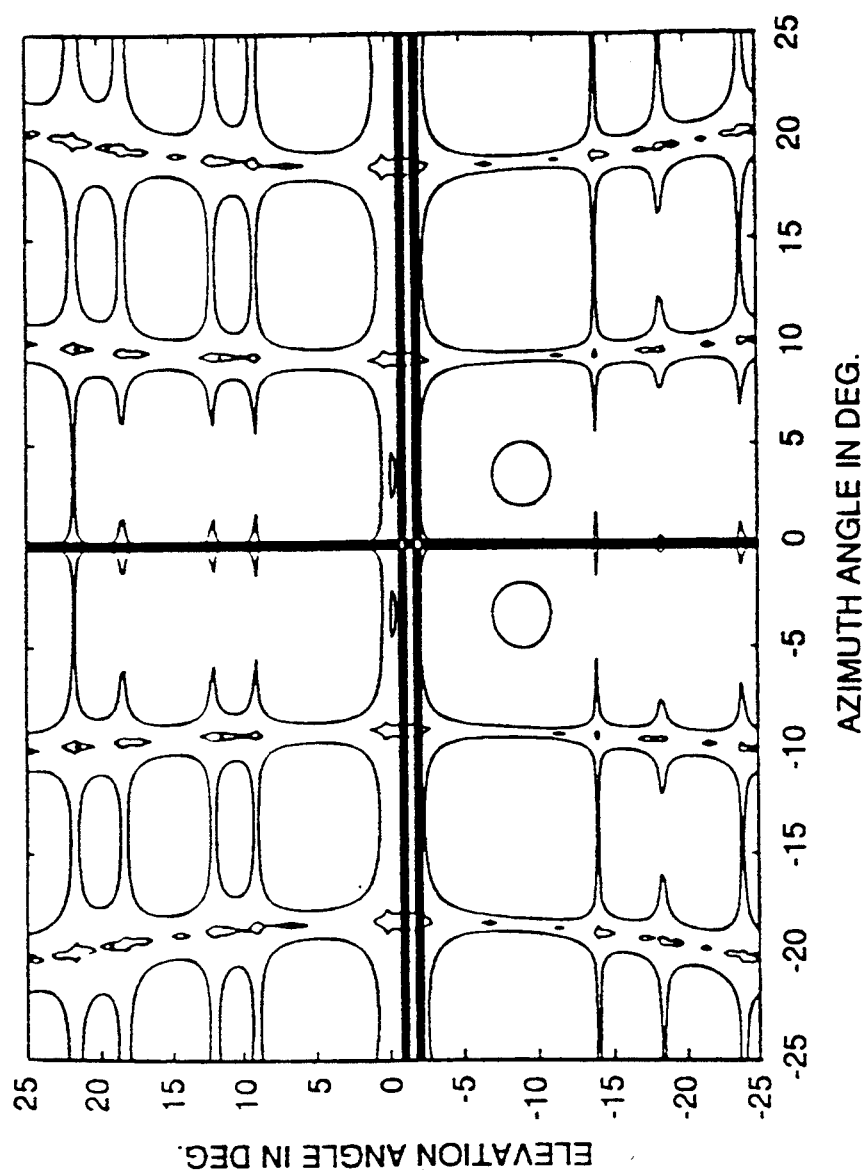
FIG. 19 is a graph showing an adapted difference azimuth beam pattern for a jamming scenario in accordance with the invention.
Figure 20:
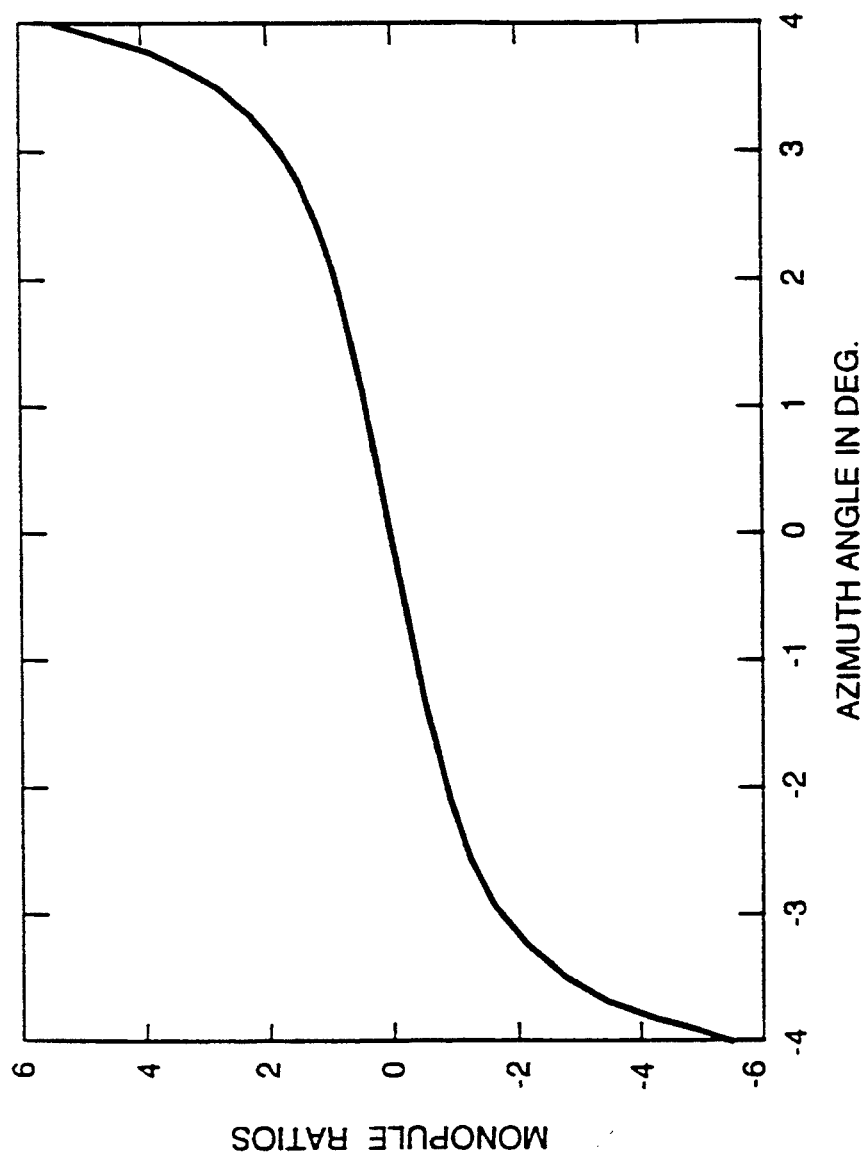
FIG. 20 is a graph of azimuth monopulse ratio for a jamming scenario in accordance with the invention.

To verify that the technique works well in nulling multiple MLJs while preserving the monopulse ratio, the adapted antenna patterns and the monopulse ratios are evaluated. The performance of the proposed technique is evaluated by computer simulation for two jamming scenarios and radar system parameters. Consider a planar array with aperture equal to 13 half-wavelengths for both dimensions. For uniform illumination, the 3 db beamwidth is 4 degrees. For the first case, there are two MLJs. They are located at (1,1) and (2, 2). The adapted sum ($\Sigma_E$) and difference ($\Delta_E$) patterns for azimuth processing are given by FIG. 18 and FIG. 19 respectively. Note that the two null strips along azimuth directions are formed at elevation angles of 1 and 2 degrees. The monopulse ratios are shown to be preserved for the entire beam except along the two null strips at elevation angles of 1 and 2 degrees. The monpulse ratios cut at elevation angles 0.5, 1.5 and 2.5 degrees are shown at FIG. 20.

Figure 21:
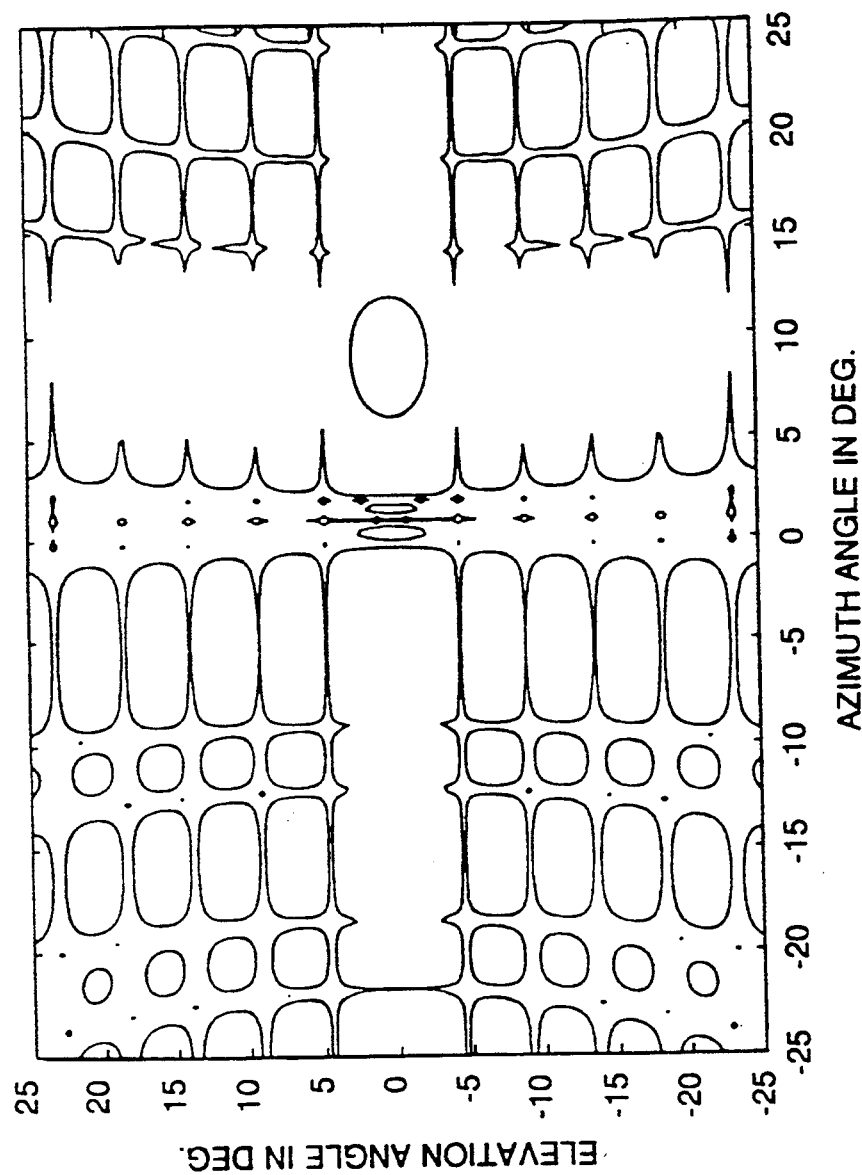
FIG. 21 is a graph showing an adapted sum elevation beam pattern for a jamming scenario in accordance with the invention.
Figure 22:
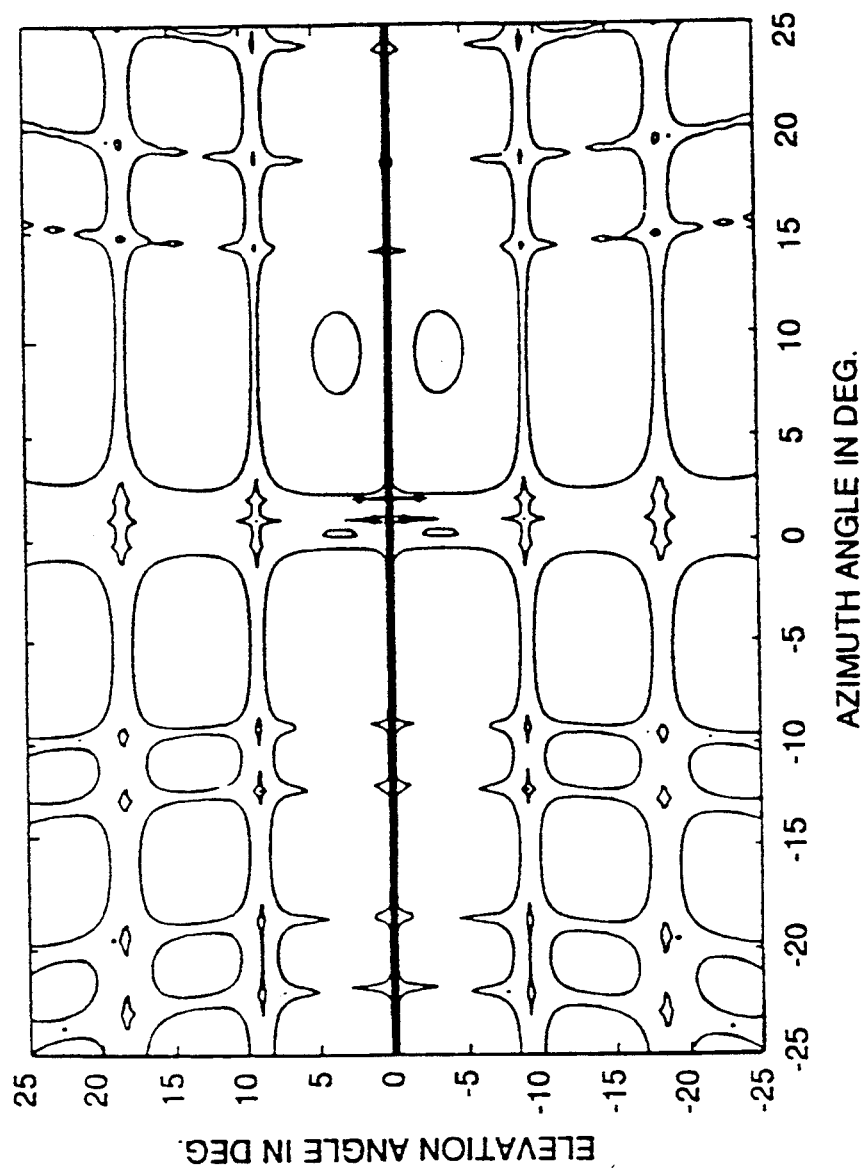
FIG. 22 is a graph showing an adapted difference elevation beam pattern for a jamming scenario in accordance with the invention.
Figure 23:
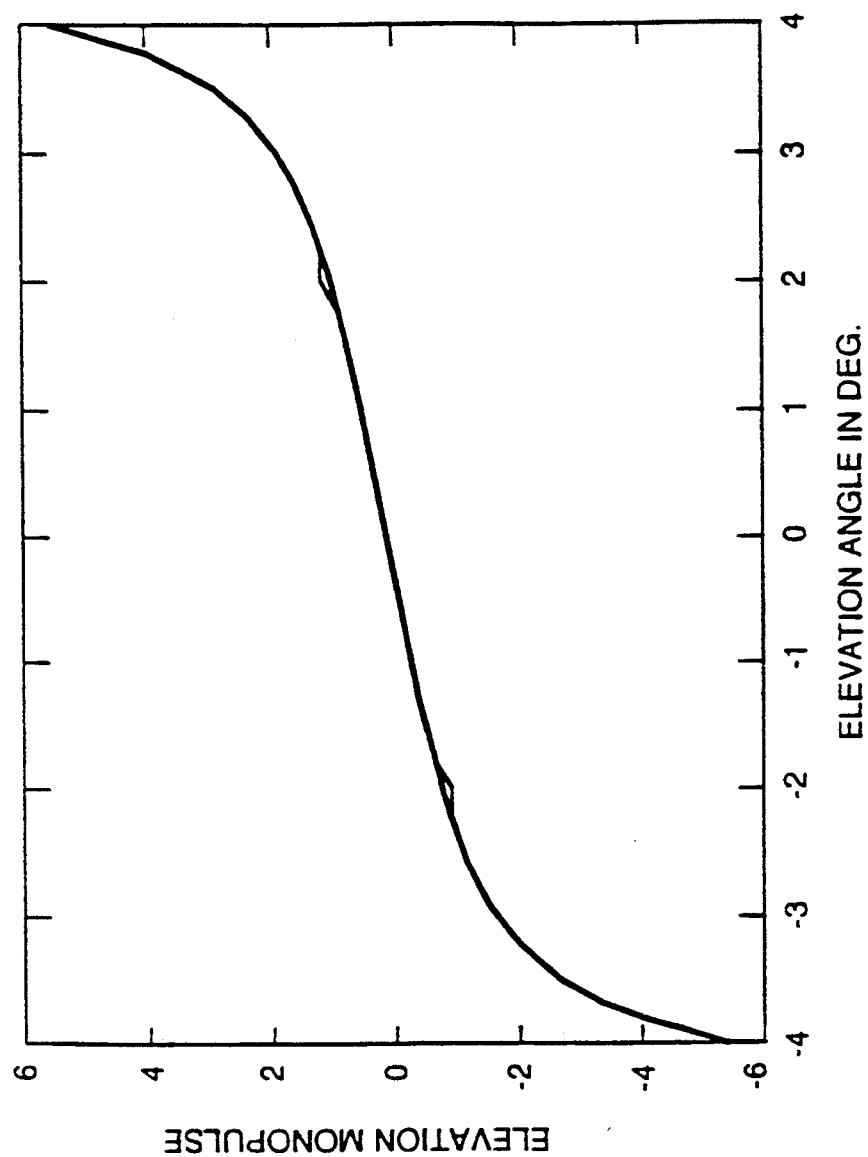
FIG. 23 is a graph of the elevation monopulse ratio for a jamming scenario in accordance with the invention.

For elevation angle processing, the sum ($\Sigma_E$) and difference ($\Delta_E$) patterns are shown in FIG. 21 and FIG. 22 respectively. Note that there are two null strips along the elevation direction formed at azimuth monopulse angles of 1 and 2 degrees. They are bent outward due to the fact that $T_x$ depends on both azimuth and elevation angles. The elevation monopulse ratios cut at azimuth angles of 0.0, 0.5, 1, 1.5, 2.0 2.5 and 3 degrees are shown at FIG. 23. They are shown to be preserved except at the cuts at azimuth angles of 1 and 2 degrees where the nulls are formed. They are completely distorted at (1,1), (1,−1), (2,2) and (2,−2) where very deep nulls are formed in the antenna patterns.

For multipath mainlobe jamming, only one weight is required for adapting the sum and difference beams for elevation angle monopulse processing as the azimuth angles of the direct and multipath jammers are the same. In our example, the jammers are located at (2,2) and (2,−2). The monopulse ratios for the azimuth angles are preserved except at the strips at elevation angles 2 and −2 degrees. The monopulse ratios for the elevation angles are preserved except at the strip at the azimuth angles of 2 degrees.

While only certain preferred features of the invention have been illustrated and described herein, many modifications and changes will occur to those skilled in the art. It is therefore, to be understood that the appended claims are intended to cover all such modifications and changes as fall within the true spirit of the invention.

We claim:

1. In a radar system for receiving, at a phased array or digital beamforming high-gain main antenna coupled to a receiver, received signals which may be made up of target signals, a multiplicity of mainlobe jammer signals, and noise, said system further including a monopulse processor for determining angle of arrival of said target signals from signals representative of formed sum and difference beams, the method of operation comprising the steps of:

forming signals representative of three multiple simultaneous received product beam sets (a) a first one of said product beam set comprising a nominal beam set including a $\Sigma_1$ sum beam equal to the product of an elevation sum beam multiplied by an azimuth sum beam, a $\Delta_{A1}$ difference beam equal to the product of an elevation sum beam multiplied by an azimuth difference beam, a $\Delta_{E1}$ difference beam equal to the product of an elevation difference beam multiplied by an azimuth sum beam, and a $\Delta_A$ difference beam equal to the product of an elevation difference beam multiplied by an azimuth difference beam, said nominal beam set being aimed in a direction toward said target, (b) a second one of said product beam sets including a $\Sigma_2$ sum beam equal to the product of an elevation sum beam multiplied by an azimuth sum beam, and a $\Delta_{A2}$ difference beam equal to the product of an elevation sum beam multiplied by an azimuth difference beam, said second beam set being aimed in a direction one null beamwidth away from said nominal beam set along elevation, and (c) a third one of said product beam sets including a $\Sigma_3$ sum beam equal to the product of an elevation sum beam multiplied by an azimuth sum beam, and a $\Delta_{A3}$ difference beam equal to the product of an elevation sum beam multiplied by an azimuth difference beam, said third beam set being aimed in a direction one null beamwidth away from said nominal beam set along azimuth;

nulling said mainlobe jammers by adaptively weighting and combining said signals representing said product beams to create signals representative of said formed beams with undistorted monopulse ratios for azimuth and elevation; and determining the angle of arrival of said target signals from said undistorted monopulse ratios.

2. The method of claim 1, wherein said received signals further include sidelobe jammer signals, said system further including an auxiliary array of low-gain sensor elements and a multiple sidelobe canceller, said method comprising the further steps of:

maintaining said mainlobes while said multiple sidelobe canceller is operable; and combining the output signals of said multiple sidelobe canceller with said signals representative of multiple simultaneous received product beam sets.

3. The method of claim 1, wherein said received signals further include multiple jammer signals, said system further including an adaptive array, said adaptive array comprising multiple elemental sensors, and operating by preprocessing, to form an identical set of nulls responsive to said sidelobe jammers, comprising the further steps of:

maintaining said main lobes while said adaptive array is operable;

spatially filtering said mainlobe jammer signals from signals supplied by said adaptive array to form spatially filtered output signals; and combining said spatially filtered output signals with said signals representative of said multiple simultaneous received product beams.

4. The method of claim 1, wherein said multiplicity of mainlobe jammers is two in number, and wherein said step of forming simultaneous received product beams includes the step of forming said product beams to represent $$\Sigma_1(T_x,T_y)=\Sigma_d(T_x)\Sigma_e(T_y)$$

$$\Delta_{A1}(T_x,T_y)=\Delta_d(T_x)\Sigma_e(T_y)$$

$$\Delta_{E1}(T_x,T_y)=\Sigma_d(T_x)\Delta_e(T_y)$$

$$\Delta_{\Delta 1}(T_x,T_y)=\Delta_d(T_x)\Delta_e(T_y)$$

$$\Sigma_2(T_x,T_y)=\Sigma_d(T_x)\Sigma_e(T_y-T_{y0})$$

$$\Delta_{A2}(T_x,T_y)=\Delta_d(T_x)\Sigma_e(T_y-T_{y0})$$

$$\Sigma_3(T_x,T_y)=\Sigma_d(T_x-T_{x0})\Sigma_e(T_y)$$

$$\Delta_{E3}(T_x,T_y)=\Sigma_d(T_x-T_{x0})\Delta_e(T_y)$$

where $\Sigma_1$ has a symmetrical profile with respect to both the azimuth and elevation directions with maximum gain at the bore sight, $\Delta_{A1}$ has a symmetrical profile with respect to the elevation direction but is anti-symmetrical with respect to the azimuth direction, $\Delta_{E1}$ is symmetrical with respect to the azimuth direction but is anti-symmetrical with respect to the elevation direction, $\Delta_{\Delta 1}$ is anti-symmetrical with respect to both directions and has a zero response at the boresight, $\Sigma_2$ and $\Delta$ are steered to $T_{y0}$ where $T_{y0}$ is one null beam width away from the boresight along the $T_y$ direction, $\Sigma_3$ and $\Delta_{E3}$ are steered to $T_{x0}$ where $T_{x0}$ is on null beam width away from the boresight along the $T_x$ direction, and said formed beams are represented by $$\Sigma_a=\Sigma_1-w_1\Delta_{E1}-w_2\Sigma_2$$

$$\Delta_A=\Delta_{A1}-w_1\Delta_{\Delta 1}-w_2\Delta_{A2}$$

$$\Sigma_E=\Sigma_1-w_3\Delta_{A1}-w_4\Sigma_3$$

$$\Delta_E=\Delta_{E1}-w_3\Delta_{\Delta 1}-w_4\Delta_{E3}$$

where $\{w_1\}$ are the optimal adaptive weights for suppressing said mainlobe jammers, said optimal adaptive weights being determined by conventional correlation processing.

* * * * *